US012573004B2

(12) United States Patent
Zhou et al.

(10) Patent No.: US 12,573,004 B2
(45) Date of Patent: Mar. 10, 2026

(54) GENERATIVE IMAGE FILLING USING A REFERENCE IMAGE

(71) Applicant: ADOBE INC., San Jose, CA (US)

(72) Inventors: Yuqian Zhou, Bellevue, WA (US); Krishna Kumar Singh, San Jose, CA (US); Zhe Lin, Clyde Hill, WA (US); Qing Liu, San Jose, CA (US); Zhifei Zhang, San Jose, CA (US); Sohrab Amirghodsi, Seattle (CA); Elya Shechtman, Seattle, WA (US); Jingwan Lu, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 150 days.

(21) Appl. No.: 18/515,378

(22) Filed: Nov. 21, 2023

(65) Prior Publication Data

US 2024/0404013 A1     Dec. 5, 2024

Related U.S. Application Data

(60) Provisional application No. 63/505,902, filed on Jun. 2, 2023.

(51) Int. Cl.
*G06T 5/50* (2006.01)
*G06T 9/00* (2006.01)

(52) U.S. Cl.
CPC .................. *G06T 5/50* (2013.01); *G06T 9/00* (2013.01); *G06T 2207/20221* (2013.01)

(58) Field of Classification Search
CPC ....................................................... G06T 5/50
See application file for complete search history.

(56) References Cited

U.S. PATENT DOCUMENTS 11,983,806 B1 * 5/2024 Ramesh .................... G06T 5/60

OTHER PUBLICATIONS

Rombach, et al., "High-Resolution Image Synthesis with Latent Diffusion Models", arXiv preprint arXiv:2112.10752v2 [cs.CV] Apr. 13, 2022, 45 pages.
Zhang, et al., "Adding Conditional Control to Text-to-Image Diffusion Models", arXiv preprint arXiv:2302.05543v2 [cs.CV] Sep. 2, 2023, 12 pages.
Li, et al., "GLIGEN: Open-Set Grounded Text-to-Image Generation", arXiv preprint arXiv:2301.07093v2 [cs.CV] Apr. 17, 2023, 21 pages.
Mou, et al., "T2I-Adapter: Learning Adapters to Dig out More Controllable Ability for Text-to-Image Diffusion Models", arXiv preprint arXiv:2302.08453v2 [cs.CV] Mar. 20, 2023, 10 pages.
Chung, et al., "Scaling Instruction-Finetuned Language Models", arXiv preprint arXiv:2210.11416v5 [cs.LG] Dec. 6, 2022, 54 pages.

(Continued)

*Primary Examiner* — Tammy Paige Goddard
(74) *Attorney, Agent, or Firm* — F. CHAU & ASSOCIATES, LLC

(57) ABSTRACT

Embodiments include systems and methods for generative image filling based on text and a reference image. In one aspect, the system obtains an input image, a reference image, and a text prompt. Then, the system encodes the reference image to obtain an image embedding and encodes the text prompt to obtain a text embedding. Subsequently, a composite image is generated based on the input image, the image embedding, and the text embedding.

20 Claims, 23 Drawing Sheets

(56) References Cited

OTHER PUBLICATIONS

Song, et al., "ObjectStitch: Object Compositing with Diffusion Model", 2023 IEEE/CVF Conference on Computer Vision and Pattern Recognition (CVPR), pp. 18310-18319.

Xu, et al., "Prompt-Free Diffusion: Taking "Text" out of Text-to-Image Diffusion Models", arXiv preprint arXiv:2305.16223v2 [cs. CV] Jun. 1, 2023, 12 pages.

Xu, et al., "Reference-based Painterly Inpainting via Diffusion: Crossing the Wild Reference Domain Gap", arXiv preprint arXiv:2307. 10584v1 [cs.CV] Jul. 20, 2023, 15 pages.

* cited by examiner

Robot Vacuum Cleaner

Sample Random Regions within the same Image

Jacket

Road

Cloud Sky

Obtain an input image, a reference image, and a text prompt    705

Encode, using an image encoder, the reference image to obtain an image embedding    710

Encode, using a text encoder, the text prompt to obtain a text embedding    715

Generate, using an image generation model, a composite image based on the input image, the image embedding, and the text embedding    720

700

Obtain an input image and a reference image

805

Insert the reference image into the input image
to obtain a combined input image

810

Encode, using an image encoder, the reference
image to obtain an image embedding

815

Generate, using an image generation model, a
composite image based on the combined input
image and the image embedding

820

800

Processor(s)

1005

I/O Interface

1020

Memory Subsystem

1010

User Interface
Component(s)

1025

Communication
Interface

1015

1030

1000

GENERATIVE IMAGE FILLING USING A REFERENCE IMAGE

CROSS-REFERENCE TO RELATED APPLICATION

This U.S. non-provisional application claims priority under 35 U.S.C. § 119 to U.S. Provisional Patent Application No. 63/505,902, filed on Jun. 2, 2023, in the United States Patent and Trademark Office, the disclosure of which is incorporated by reference herein in its entirety.

BACKGROUND

The following relates generally to machine learning, and more specifically to machine learning for image editing. Digital image processing generally refers to the process of making changes to a digital image using a computer or other electronic device. A computer or other electronic device may use an algorithm, a processing network, etc. to make changes to a digital image. In some cases, image processing software may be used for various image processing tasks, such as image editing, image generation, etc. Some image processing systems may implement machine learning techniques, for example, to perform tasks using predictive models (e.g., without explicitly programing the system for each task), to perform tasks with more accuracy or in less time, to perform tasks using special-purpose hardware, etc. Examples of machine learning architectures used for generating image data include generative adversarial networks (GANs) and diffusion models.

SUMMARY

The present disclosure describes systems and methods for image editing. Embodiments of the present disclosure include an image editing apparatus configured to fill a masked portion of an input image using a reference image. The image editing apparatus may obtain an input image, a reference image, and a text prompt, and the image editing apparatus may generate a composite image based on the input image, the reference image, and the text prompt. In particular, the image editing apparatus may edit a masked portion of the input image based on the reference image and the text prompt. In some examples, the masked portion of the input image may be edited to include an object from the reference image or to depict a style or texture from the reference image.

A method, apparatus, non-transitory computer readable medium, and system for machine learning for image editing are described. One or more aspects of the method, apparatus, non-transitory computer readable medium, and system include obtaining an input image, a reference image, and a text prompt; encoding, using an image encoder, the reference image to obtain an image embedding; encoding, using a text encoder, the text prompt to obtain a text embedding; and generating, using an image generation model, a composite image based on the input image, the image embedding, and the text embedding.

A method, apparatus, non-transitory computer readable medium, and system for machine learning for image editing are described. One or more aspects of the method, apparatus, non-transitory computer readable medium, and system include obtaining an input image, and a reference image; inserting the reference image into the input image to obtain a combined input image; encoding, using an image encoder, the reference image to obtain an image embedding; and generating, using an image generation model, a composite image based on the combined input image, and the image embedding.

An apparatus, system, and method for machine learning for image editing are described. One or more aspects of the apparatus, system, and method include at least one memory; at least one processing device coupled to the at least one memory, wherein the processing device is configured to execute instructions stored in the at least one memory; an image encoder configured to encode a reference image to obtain an image embedding; a text encoder configured to encode a text prompt to obtain a text embedding; and an image generation model configured to generate a composite image based on an input image, the image embedding, and the text embedding.

DETAILED DESCRIPTION

Figure 1:
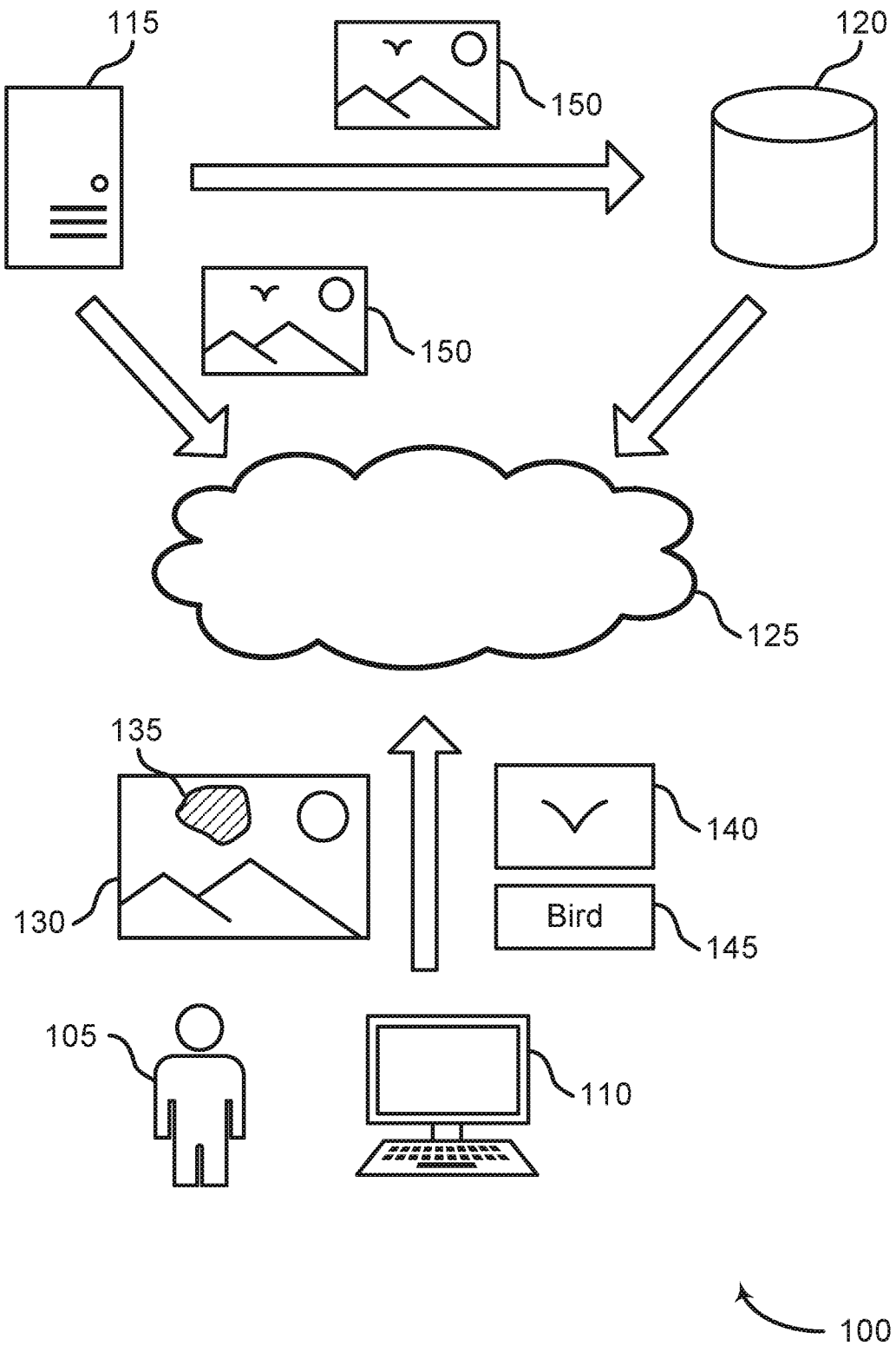
FIG. 1 shows an example of an image editing system according to aspects of the present disclosure.

The present disclosure describes systems and methods for image editing. Embodiments of the present disclosure include an image editing apparatus configured to fill a masked portion of an input image using a reference image.

Some image generation models (e.g., diffusion-based models) may support conditional image generation to allow a user to specify one or more conditions for generating an image. The conditions may correspond to image features in a latent space that may guide an image generation model to generate an image with the image features. "Features" generally refer to representative characteristics of data, and may be represented by, e.g., vectors or tensors of numbers. In some examples, the conditions may be specified by a user using natural language text. The natural language text may be tokenized and mapped to one or more vectors in the latent space of the image generation model. In some examples, however, it may be challenging to find appropriate text to describe image features to include in a generated image. Further, if the text specifies that an object is to be inserted into an input image, it may be challenging to conform the object to the style and texture of the input image while maintaining the distinctiveness and recognizability of the object.

Embodiments of the present disclosure include an image editing apparatus configured to edit an input image using a reference image. The image editing apparatus may obtain an input image, a mask, a reference image, and a text prompt, and the image editing apparatus may generate a composite image based on the input image, the mask, the reference image, and the text prompt. In particular, the image editing apparatus may edit a masked portion of the input image based on the reference image and the text prompt. In some cases, the mask can be received from a user, or can be determined based on the text prompt, the input image, or the reference image. In some examples, the image editing apparatus may insert the reference image into the input image to obtain a combined input image, and the image editing apparatus may perform a self-attention operation on the combined input image to include the reference image in a masked portion of the input image while preserving the identity of the reference image.

Because the image editing apparatus may take a reference image as input, a user may more easily specify desired image features to guide an image generation model to edit an input image. Further, because the image editing apparatus may use a self-attention operation to insert an object into an input image, the object may be inserted into the input image without having to train an additional image encoder to encode the object. The self-attention operation may blend the object into a masked portion of the input image while maintaining the distinctiveness and recognizability of the object. Accordingly, embodiments improve on existing image generation and inpainting systems by enabling the insertion of image content into an image such that the image content includes features from both a text description and a reference image. Details regarding the architecture of an example image editing apparatus are provided with reference to FIGS. 1-5. Example methods for image editing are provided with reference to FIGS. 6-8. An example training process is described with reference to FIG. 9.

Network Architecture

FIGS. 1-5 illustrate an example image editing system, along with examples of the inputs and outputs of the system. One or more aspects of the method, apparatus, non-transitory computer-readable medium, and system include at least one memory; at least one processing device coupled to the at least one memory, wherein the processing device is configured to execute instructions stored in the at least one memory; an image encoder configured to encode a reference image to obtain an image embedding; a text encoder configured to encode a text prompt to obtain a text embedding; and an image generation model configured to generate a composite image based on an input image, a mask, the image embedding, and the text embedding.

In some aspects, the image generation model comprises a diffusion model. In some aspects, the image generation model comprises a self-attention layer configured to operate on a combination of the input image and the reference image. In some aspects, the image encoder and the text encoder are components of a multimodal encoder. In some aspects, the image generation model uses the image embedding and the text embedding for classifier-free guidance. Some examples of the apparatus, system, and method further include a user interface configured to obtain a selection input from a user, wherein the mask is based on the selection input. Some examples of the apparatus, system, and method further include a training component configured to train the image generation model.

FIG. 1 shows an example of an image editing system 100 according to aspects of the present disclosure. In one aspect, image editing system 100 includes user 105, computing device 110, image editing apparatus 115, database 120, and cloud 125. Image editing apparatus 115 is an example of, or includes aspects of, the corresponding element described with reference to FIG. 2.

User 105 may interact with image editing software on user device 110. The user device 110 may communicate with the image editing apparatus 115 via the cloud 125. In some examples, user 105 may provide an input image 130, a mask 135, a reference image 140, and a text prompt 145 to the image editing apparatus 115 via the user device 110. In some examples, the user device 110 comprises a user interface configured to obtain a selection input from the user 105 (e.g., a selection input corresponding to the mask 135). The image editing apparatus 115 may then generate a composite image 150 depicting the input image 130 with a masked portion corresponding to the mask 135 filled using the reference image 140 and based on the text prompt 145. In some examples, the image editing apparatus 115 may upload the composite image 150 to the database 120, or the image editing apparatus 115 may provide the composite image 150 to the user 105 (e.g., via the user device 110). Thus, the image editing apparatus 115 may be used to fill a masked portion of an input image using a reference image.

In some examples, the image editing apparatus 115 may include a server. A server provides one or more functions to users (e.g., a user 105) linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device (e.g., user device 110), a personal computer, a laptop computer, a mainframe computer, a super computer, or any other suitable processing apparatus.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database. In some cases, a user 105 interacts with a database controller. In other cases, a database controller may operate automatically without user interaction.

A cloud 125 is a computer network configured to provide on-demand availability of computer system resources, such as data storage and computing power. In some examples, the cloud 125 provides resources without active management by the user 105. The term "cloud" is sometimes used to describe data centers available to many users over the Internet. Some large cloud networks have functions distributed over multiple locations from central servers. A server is designated an edge server if the server has a direct or close connection to a user. In some cases, a cloud 125 is limited to a single organization. In other examples, the cloud 125 is available to many organizations. In one example, a cloud 125 includes a multi-layer communications network comprising multiple edge routers and core routers. In another example, a cloud 125 is based on a local collection of switches in a single physical location.

A user device 110 (e.g., a computing device) is a personal computer, laptop computer, mainframe computer, palmtop computer, personal assistant, mobile device, or any other suitable processing apparatus.

Figure 2:
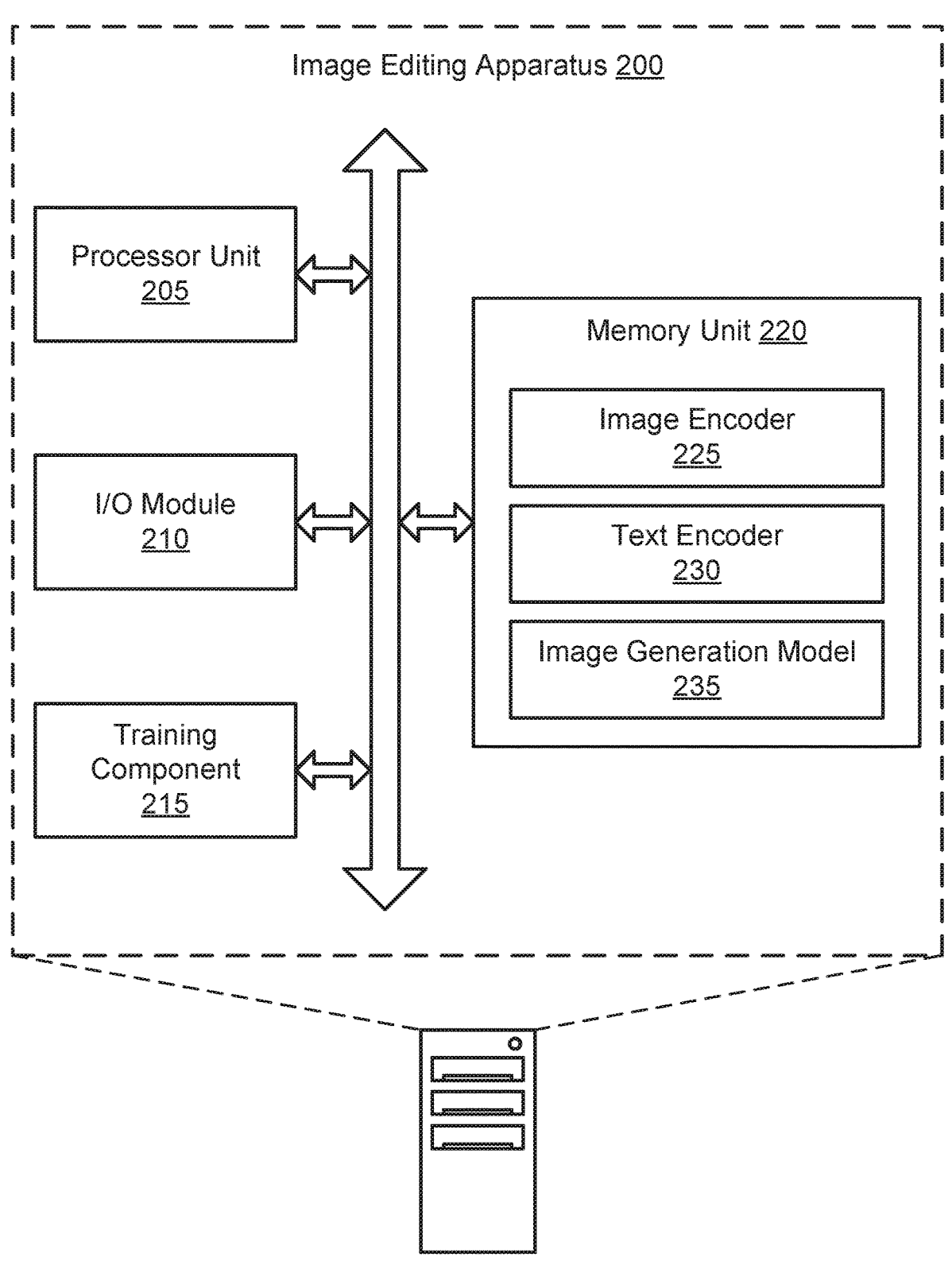
FIG. 2 shows an example of an image editing apparatus according to aspects of the present disclosure.

FIG. 2 shows an example of an image editing apparatus 200 according to aspects of the present disclosure. Image editing apparatus 200 is an example of, or includes aspects of, the corresponding element described with reference to FIG. 1. In one aspect, image editing apparatus 200 includes processor unit 205, I/O module 210, training component 215, and memory unit 220. In one aspect, memory unit 220 includes image encoder 225, text encoder 230, and image generation model 235. That is, the image encoder 225, text encoder 230, and image generation model 235 may be embedded in the memory unit 220, parameters of the image encoder 225, text encoder 230, and image generation model 235 may be stored in the memory unit 220, or the image encoder 225, text encoder 230, and image generation model 235 may communicate with the memory unit 220.

Processor unit 205 comprises a processor. Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 205 is configured to operate a memory array using a memory controller. In other cases, a memory controller is integrated into the processor unit 205. In some cases, the processor unit 205 is configured to execute computer-readable instructions stored in a memory to perform various functions. In some embodiments, a processor unit 205 includes special-purpose components for modem processing, baseband processing, digital signal processing, or transmission processing.

Memory unit 220 comprises a memory including instructions executable by the processor. Examples of a memory unit 220 include random access memory (RAM), read-only memory (ROM), or a hard disk. Examples of memory units 220 include solid state memory and a hard disk drive. In some examples, memory is used to store computer-readable, computer-executable software including instructions that, when executed, cause a processor to perform various functions described herein. In some cases, the memory unit 220 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory unit 220 store information in the form of a logical state.

I/O module 210 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 210 includes a user interface. A user interface may enable a user to interact with a device. In some embodiments, the user interface may include an audio device, such as an external speaker system, an external display device such as a display screen, or an input device (e.g., remote-control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

In some examples, image editing apparatus 200 includes a computer-implemented artificial neural network (ANN). For example, image encoder 225, text encoder 230, and image generation model 235 may each include an ANN. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, the node processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

In some examples, image editing apparatus 200 includes a computer-implemented convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). For example, each node of the first layer of a CNN (after the input layer which usually corresponds to the input image) may evaluate a limited field corresponding to a patch of pixels in the input image. During a forward pass of the CNN, filters at each layer may be convolved across the input volume, computing the dot product between the filter and the input. During the training process, the filters may be modified so that they activate when they detect a particular feature within the input.

In some examples, image editing apparatus 200 includes a transformer. A transformer or transformer network is a type of neural network model used for natural language processing tasks. A transformer network transforms one sequence into another sequence using an encoder and a decoder. The encoder and decoder include modules that can be stacked on top of each other multiple times. The modules comprise multi-head attention and feedforward layers. The inputs and outputs (target sentences) are first embedded into an n-dimensional space. Positional encoding of the different words (i.e., give every word/part in a sequence a relative position since the sequence depends on the order of its elements) is added to the embedded representation (n-dimensional vector) of each word. In some examples, a transformer network includes attention mechanism, where the attention looks at an input sequence and decides at each step which other parts of the sequence are important. The attention mechanism involves query, keys, and values denoted by Q, K, and V, respectively. Q corresponds to a matrix that contains the query (vector representation of one word in the sequence), K corresponds to all the keys (vector representations of all the words in the sequence), and V corresponds to the values, which are again the vector representations of all the words in the sequence. For the encoder and decoder, multi-head attention modules, V consists of the same word sequence as Q. However, for the attention module that is taking into account the encoder and the decoder sequences, V is different from the sequence represented by Q. In some cases, values in V are multiplied and summed with some attention-weights a.

In some examples, the training component 215 is implemented as software stored in memory and executable by a processor of a separate computing device, as firmware in the separate computing device, as one or more hardware circuits of the separate computing device, or as a combination thereof. In some examples, training component 215 is part of another apparatus other than image editing apparatus 200 and communicates with the image editing apparatus 200. In some examples, the training component 215 may be configured to train the image generation model 235.

In some examples, the image encoder 225 or the text encoder 225 comprises a multimodal encoder, such as a contrastive language-image pre-training (CLIP) encoder. CLIP is a neural network-based model that is trained on a massive dataset of images and text (e.g., image captions). CLIP uses a technique called contrastive learning to learn underlying patterns and features of data. This allows CLIP to understand the relationships between different objects and scenes in images, and to classify the objects and scenes based on the content in the objects and scenes. CLIP is multimodal in that it can process and understand multiple types of data inputs, such as text and images. In some examples, CLIP can be fine-tuned for specific tasks, such as recognizing specific objects in images. CLIP's ability to generalize from one task to another and to be fine-tuned for new tasks makes it a highly versatile model.

In some examples, the image generation model 235 comprises a diffusion model. Diffusion models are a class of generative neural networks which can be trained to generate new data (e.g., novel images) with features similar to features found in training data. Diffusion models can be used for various image generation tasks including image super-resolution, generation of images with perceptual metrics, conditional generation (e.g., generation based on text guidance), image inpainting, and image manipulation. Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

In some examples, the image generation model 235 may be used for classifier-free image generation. Classifier-free image generation refers to the process of generating images without relying on explicit classifiers or labels. Traditional image generation methods often use predefined classifiers or labels to guide the generation process, such as conditional generative models where images are generated based on specific class labels. However, in classifier-free image generation, the emphasis is on allowing the model to generate images freely, without any specific constraints or guidance from classifiers. This approach aims to encourage more creative and diverse image synthesis. Thus, classifier-free image generation methods may allow for more open-ended exploration and creativity, as the models are not limited to predefined labels or categories.

According to some aspects, image editing apparatus 200 obtains an input image, a mask, a reference image, and a text prompt. According to some aspects, image encoder 225 encodes the reference image to obtain an image embedding. According to some aspects, text encoder 230 encodes the text prompt to obtain a text embedding. According to some aspects, image generation model 235 generates a composite image based on the input image, the mask, the image embedding, and the text embedding. In some aspects, the image generation model 235 uses the image embedding and the text embedding for classifier-free guidance.

In some examples, image editing apparatus 200 provides the image embedding and the text embedding as guidance for the image generation model 235. In some aspects, the composite image includes content corresponding to the reference image in a region corresponding to the mask. In some aspects, the composite image includes content corresponding to the input image in a region outside of the mask.

In some aspects, the text prompt describes an object in the reference image. In some aspects, the reference image includes a portion of the input image. For example, in some cases, the reference image may be obtained by identifying a portion of the input image, rather than from a separate image. In some aspects, the reference image includes a style from the input image. In some aspects, the composite image includes an object described by the text prompt with a style from the reference image. In some aspects, the mask indicates a background region generated by the image generation model based on the reference image.

According to some aspects, image editing apparatus 200 obtains an input image, a mask, and a reference image. In some examples, image editing apparatus 200 inserts the reference image into the input image to obtain a combined input image. According to some aspects, image encoder 225 encodes the reference image to obtain an image embedding. According to some aspects, image generation model 235 generates a composite image based on the combined input image, the mask, and the image embedding.

In some examples, image generation model 235 performs a self-attention operation on the combined input image, where the composite image is generated based on the self-attention operation. For instance, the image generation model 235 includes a self-attention layer configured to operate on the combined input image (e.g., a combination of the input image and the reference image).

According to some aspects, text encoder 230 obtains a text prompt. In some examples, text encoder 230 encodes the text prompt to obtain a text embedding, where the composite image is generated based on the text embedding. In some aspects, the reference image is inserted into the input image in a region outside of the mask.

Figure 3A:
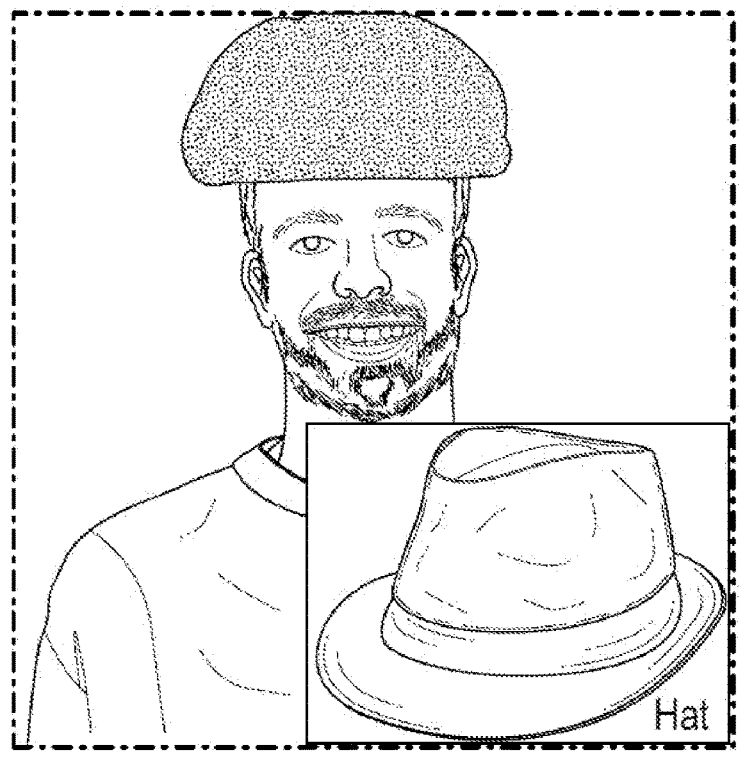
FIG. 3A through 3N show examples of generative image filling using a reference image according to aspects of the present disclosure.
Figure 3A:
Figure 3B:
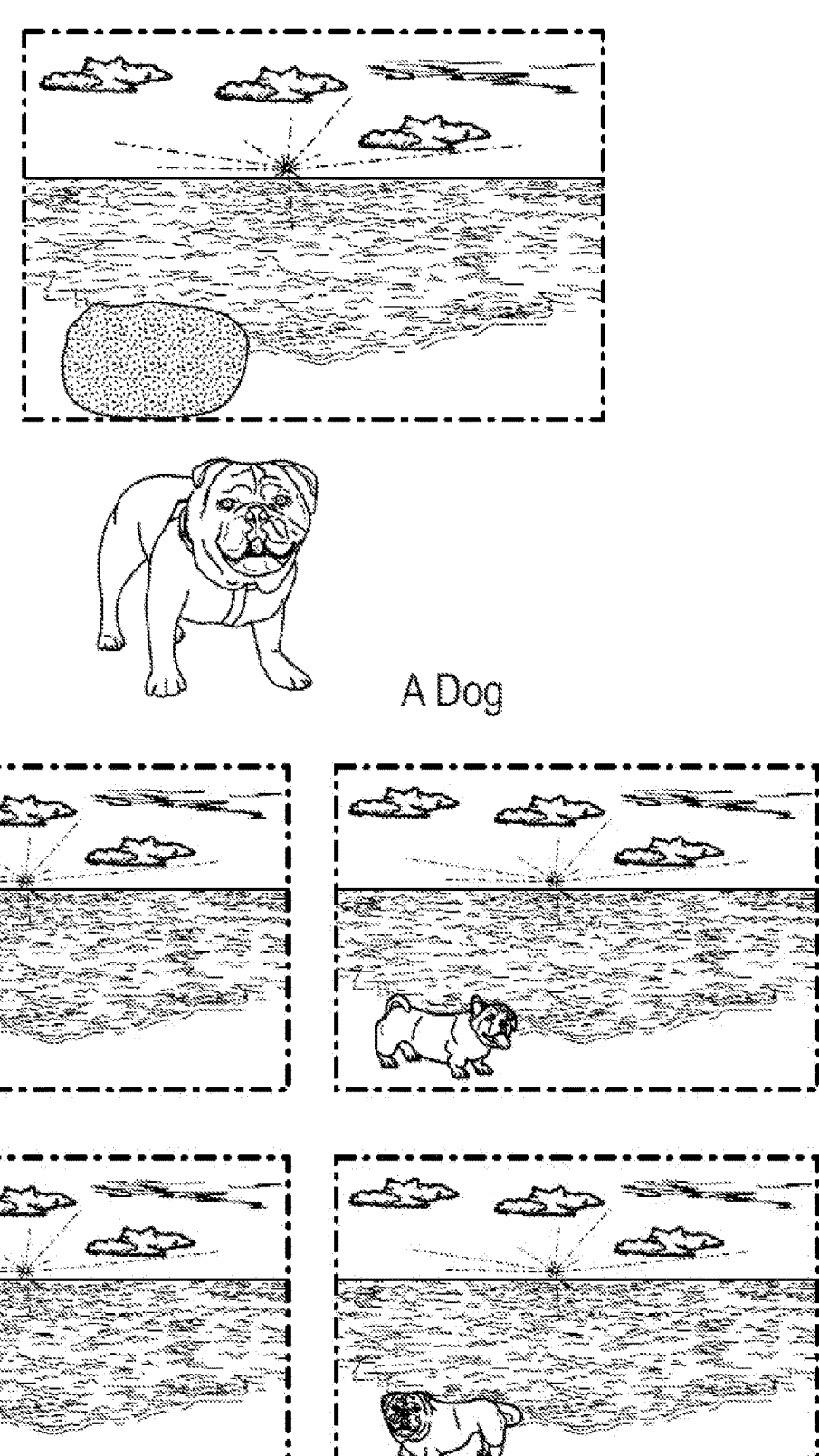
Figure 3C:
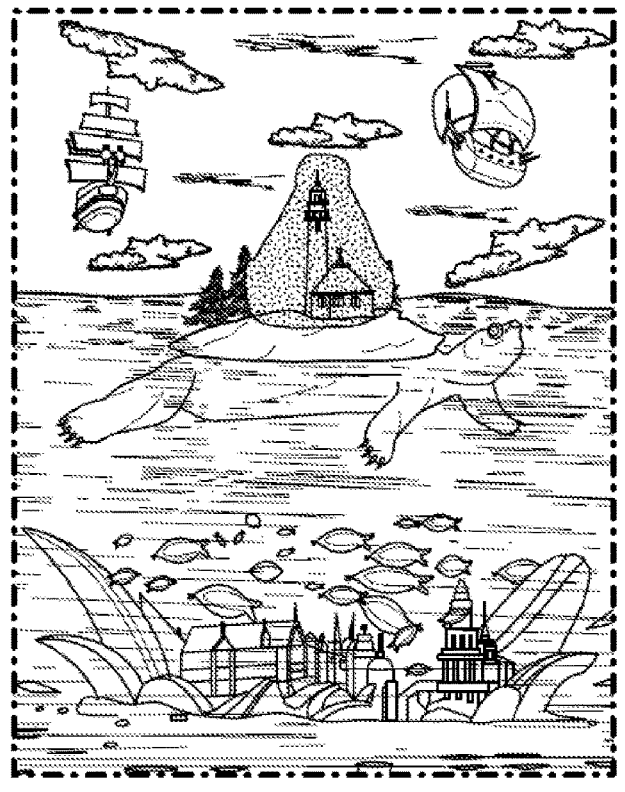
Figure 3C:
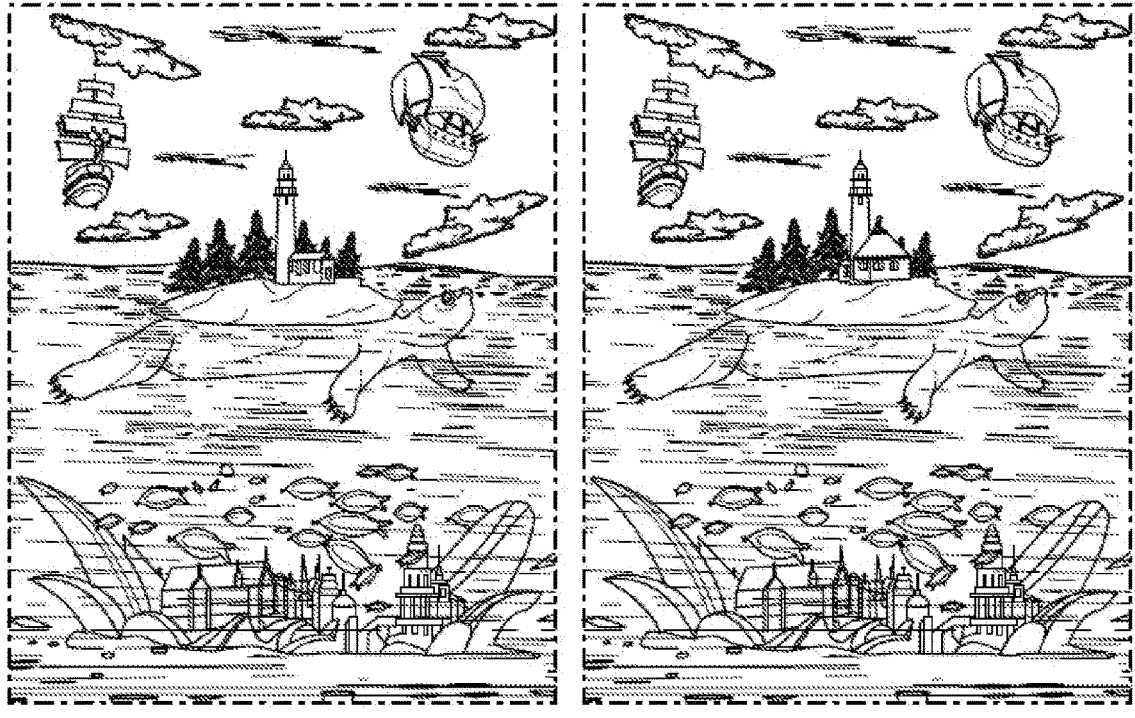
Figure 3D:
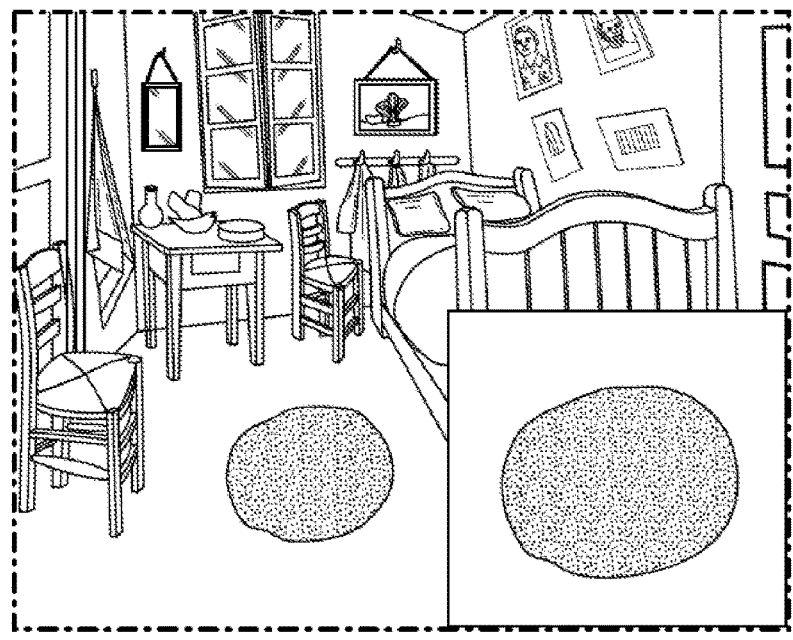
Figure 3D:
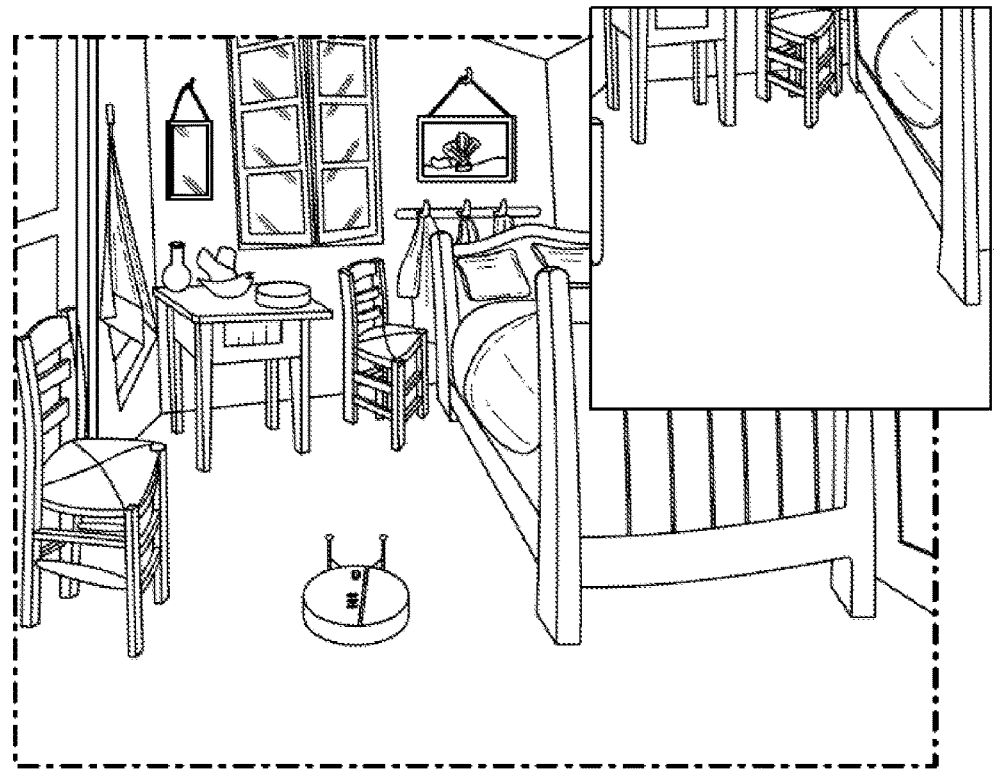
Figure 3E:
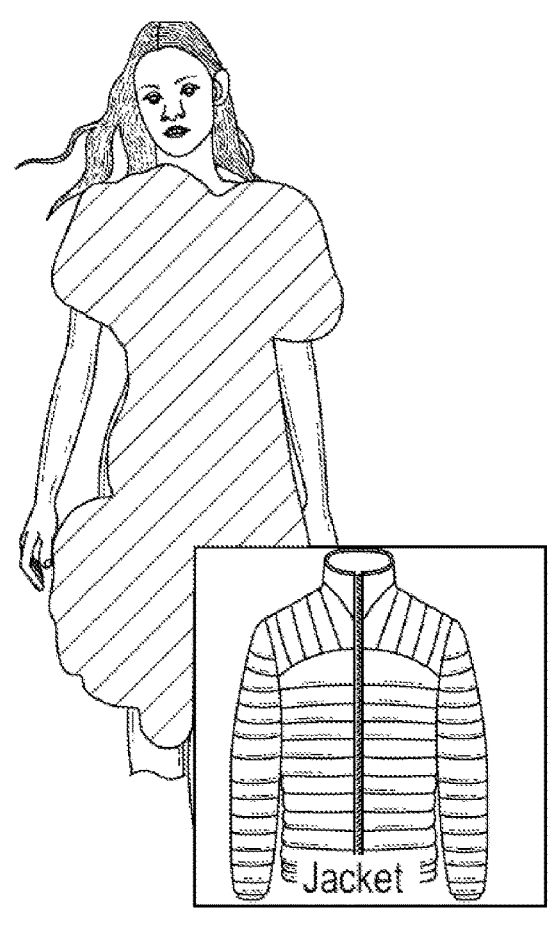
Figure 3E:
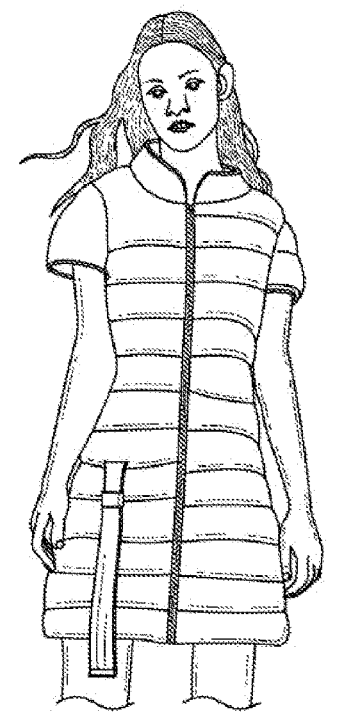
Figure 3E:
Figure 3F:
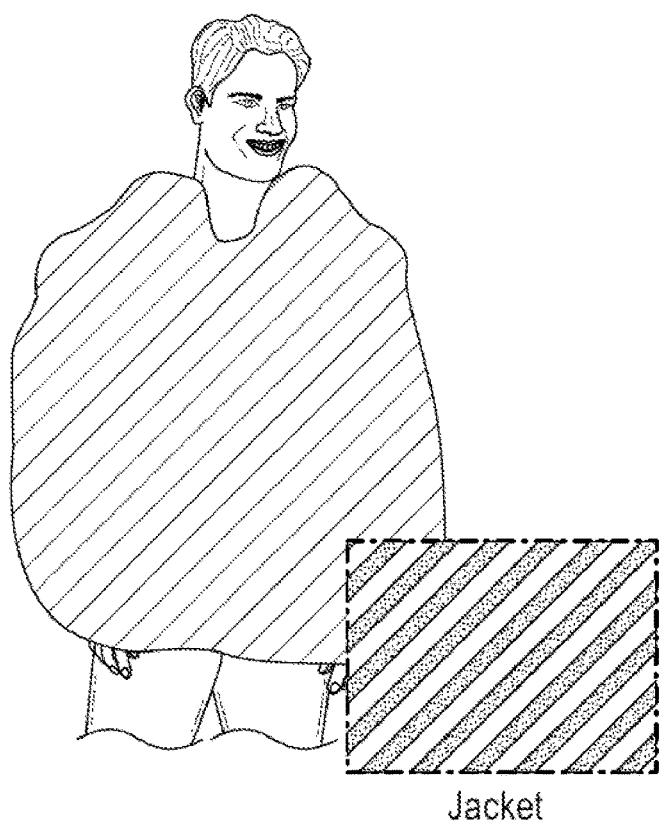
Figure 3F:
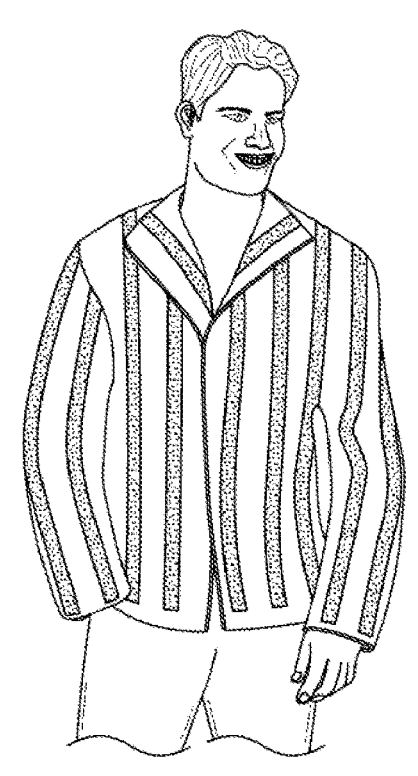
Figure 3G:
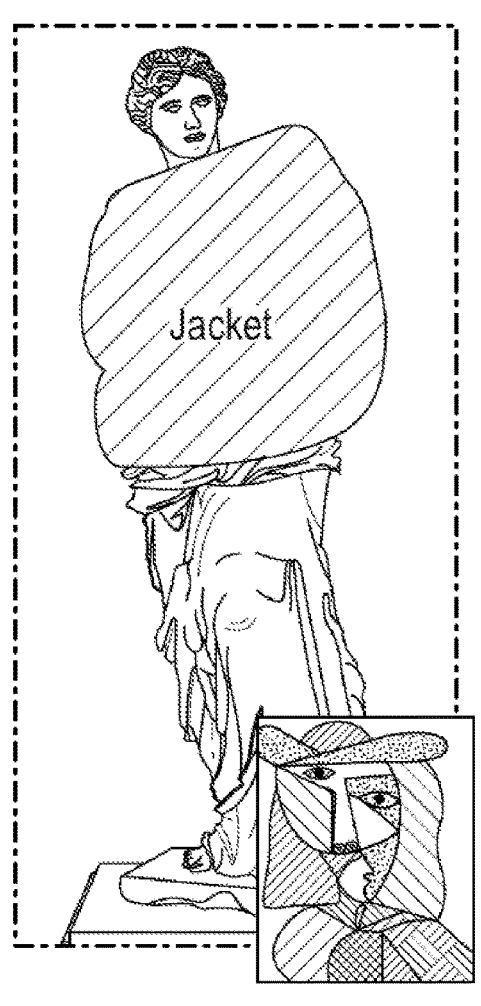
Figure 3G:
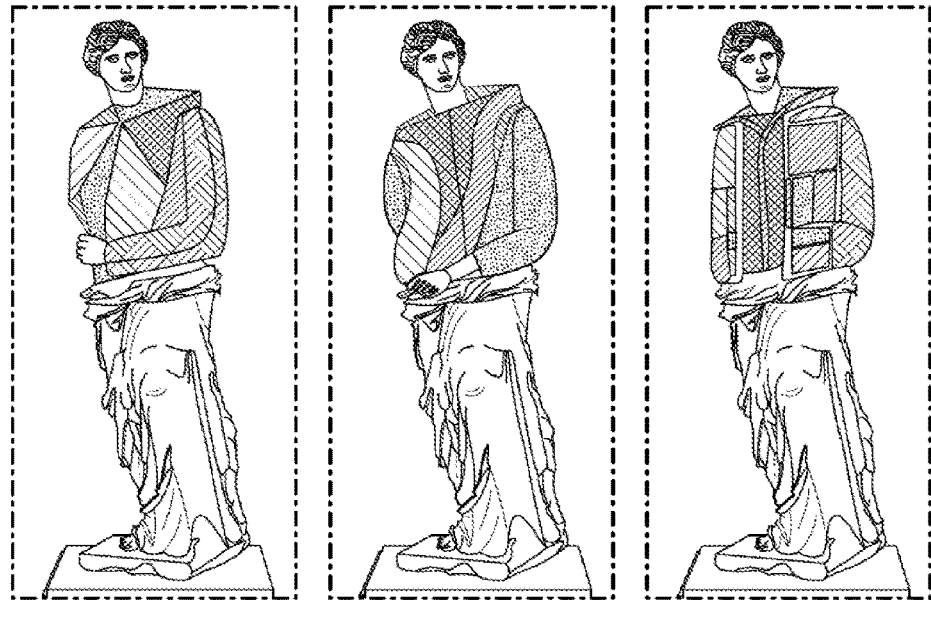
Figure 3H:
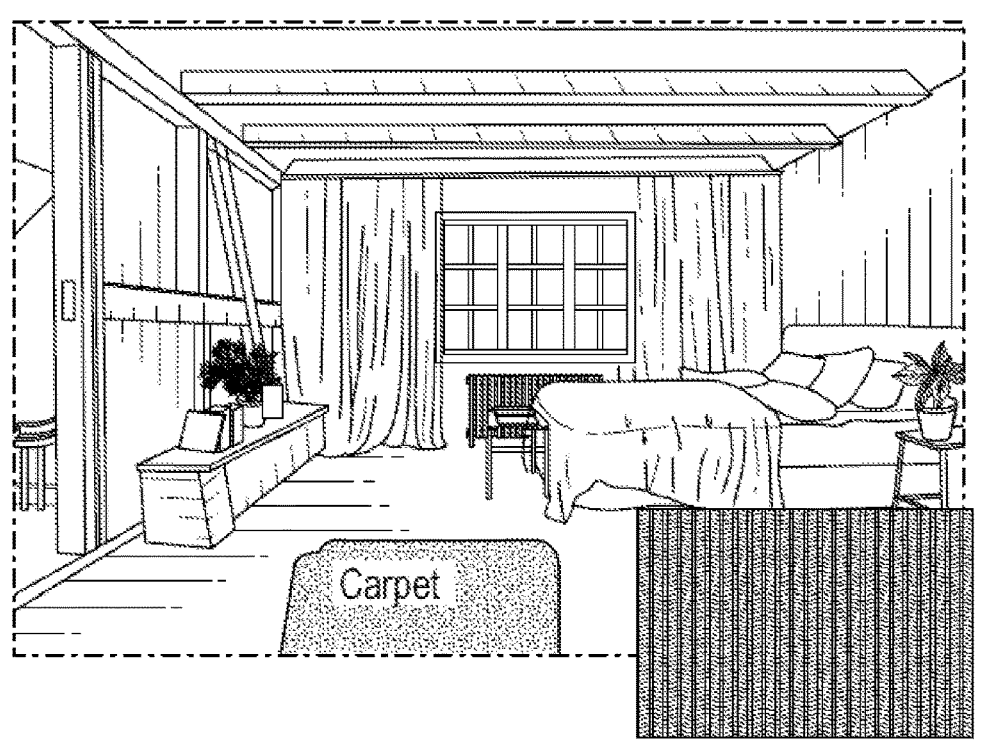
Figure 3H:
Figure 3I:
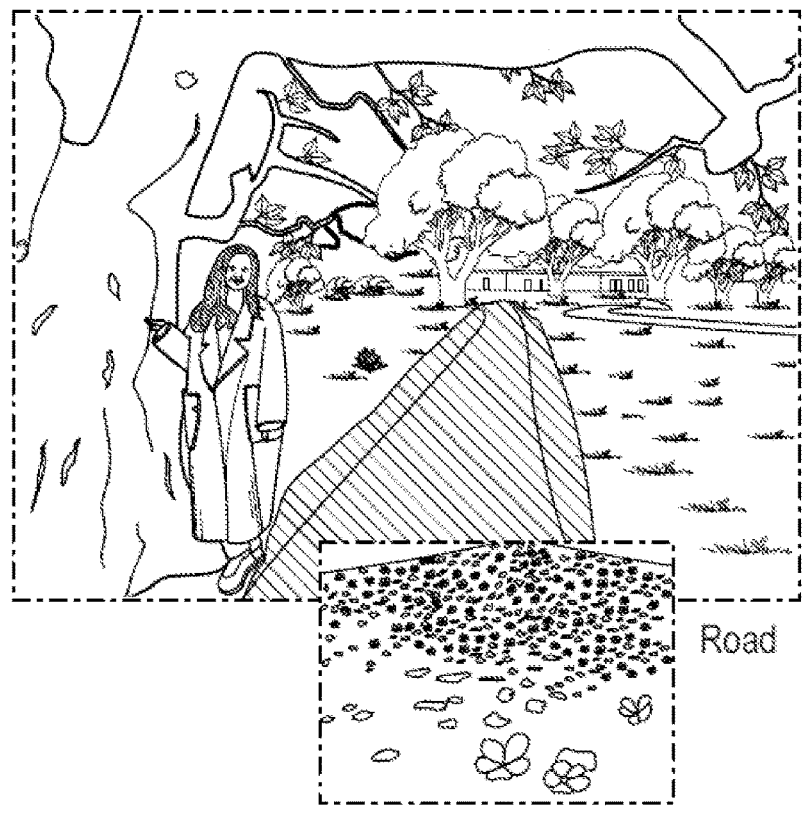
Figure 3I:
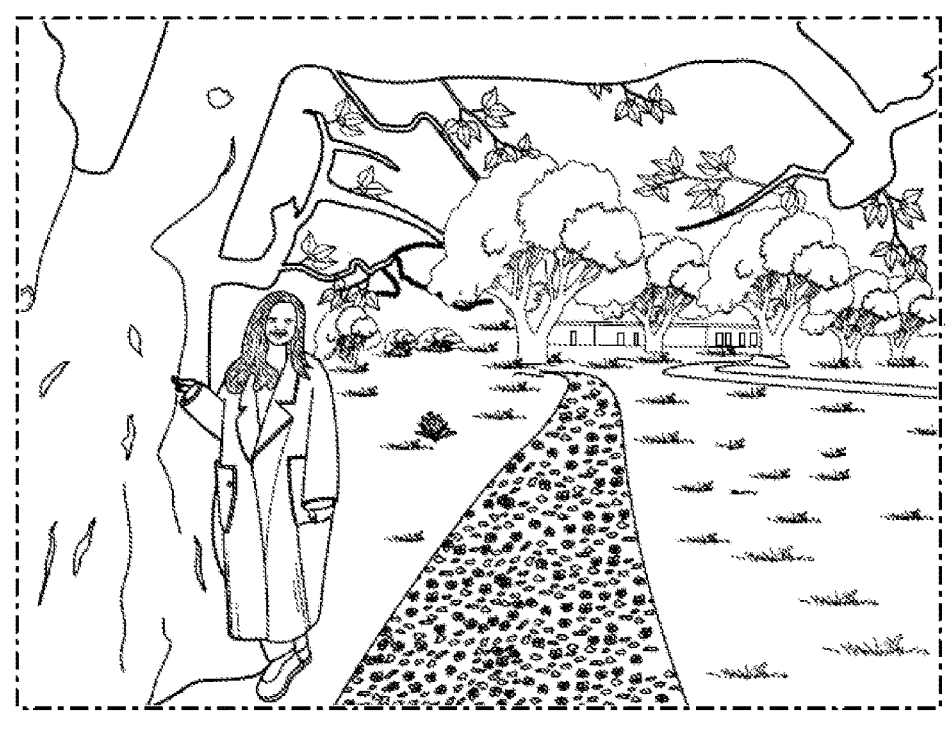
Figure 3J:
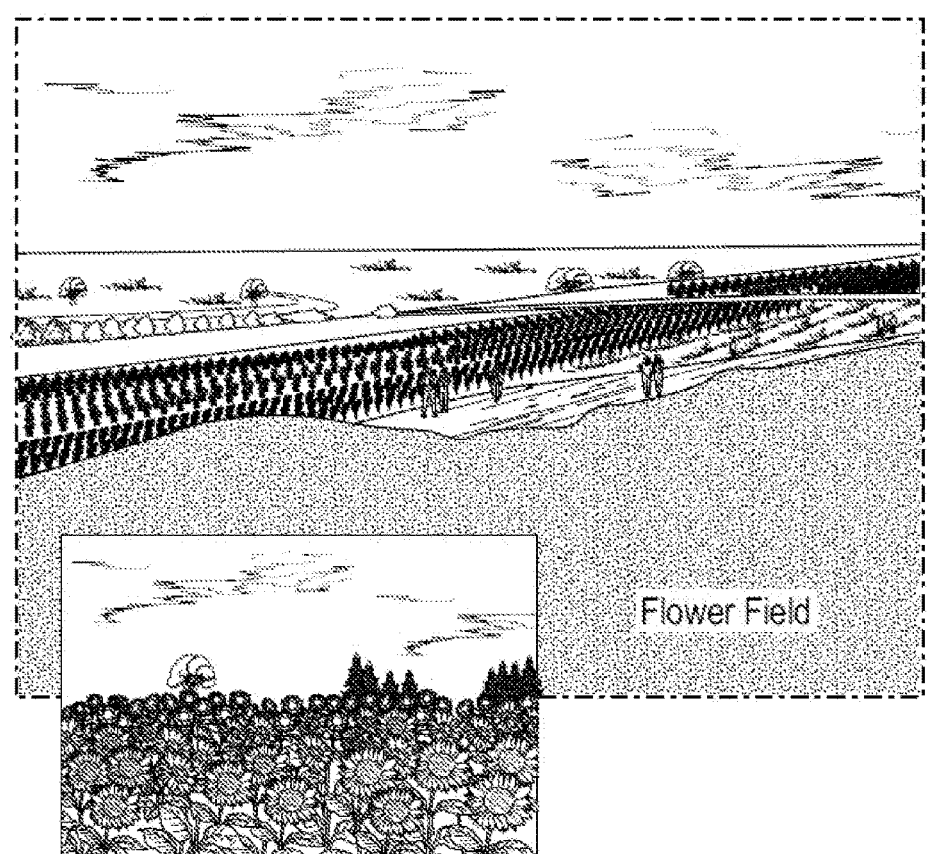
Figure 3J:
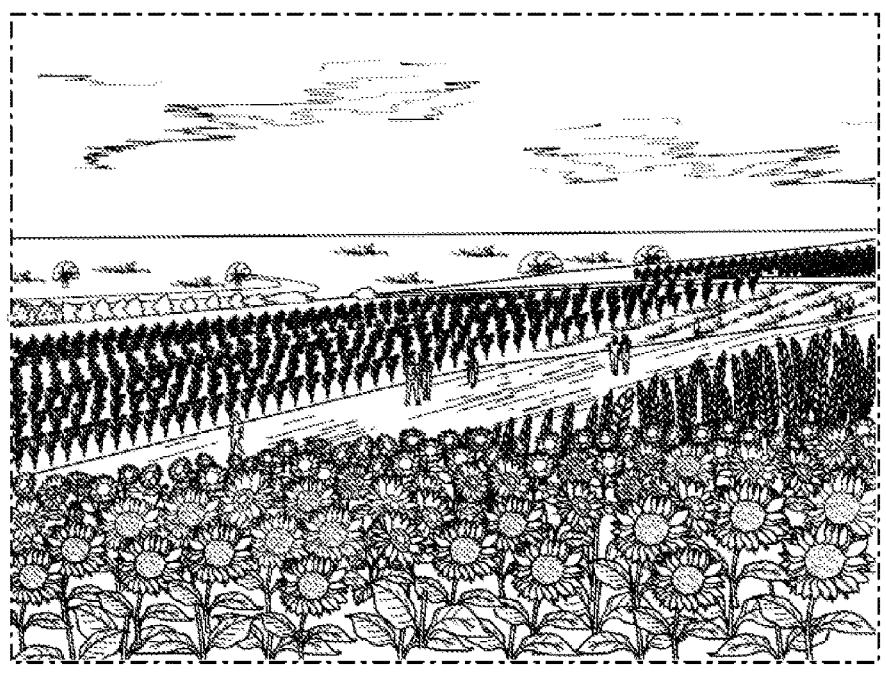
Figure 3K:
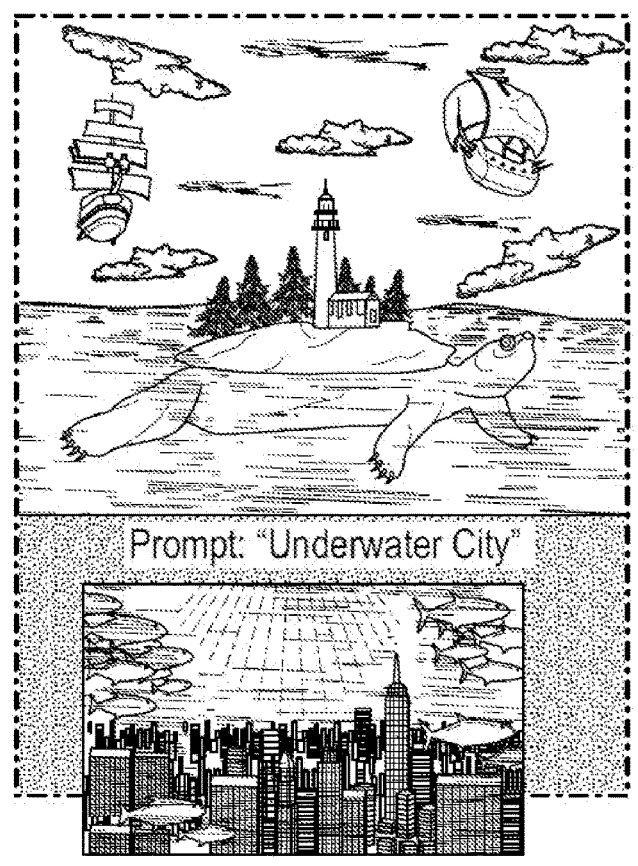
Figure 3K:
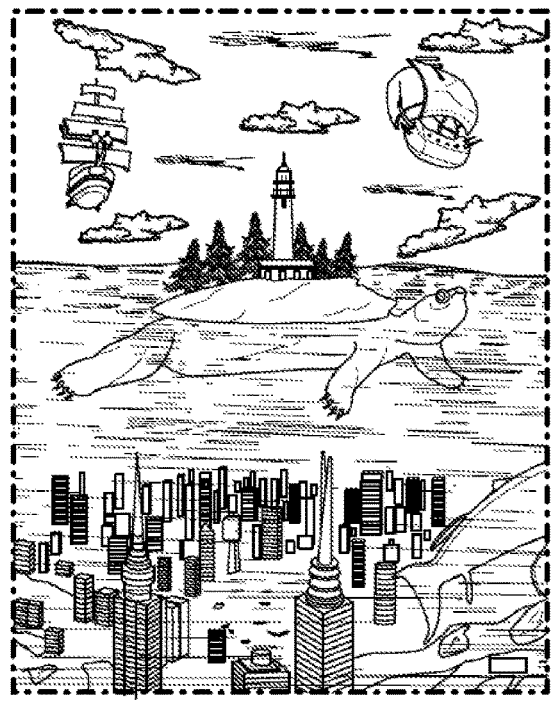
Figure 3K:
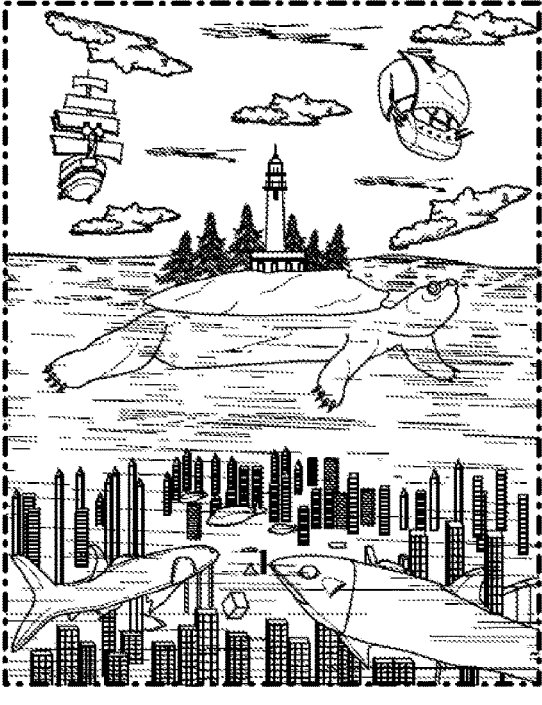
Figure 3L:
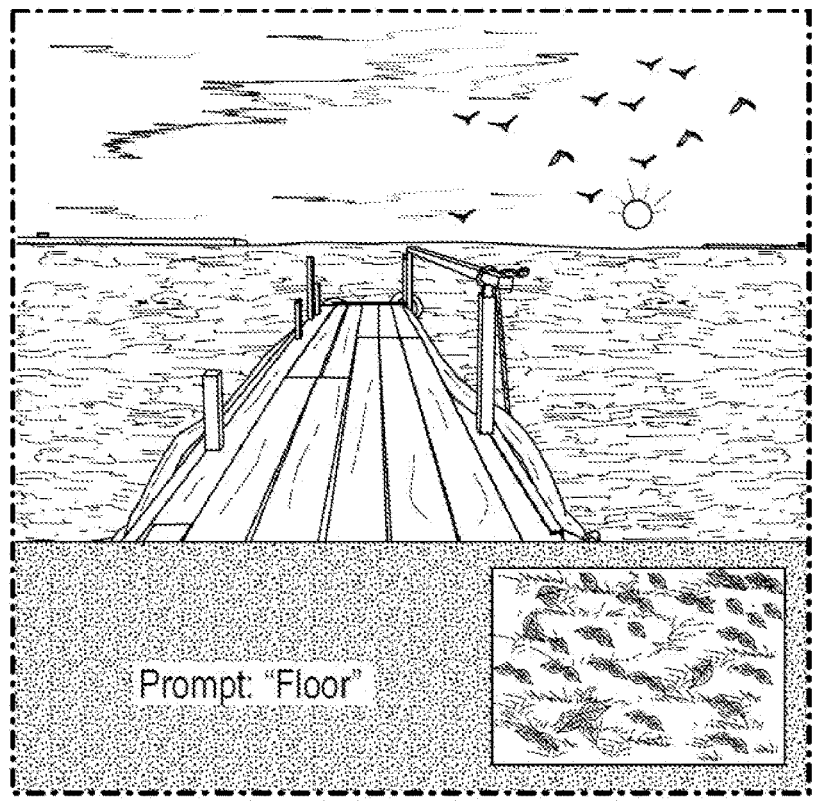
Figure 3L:
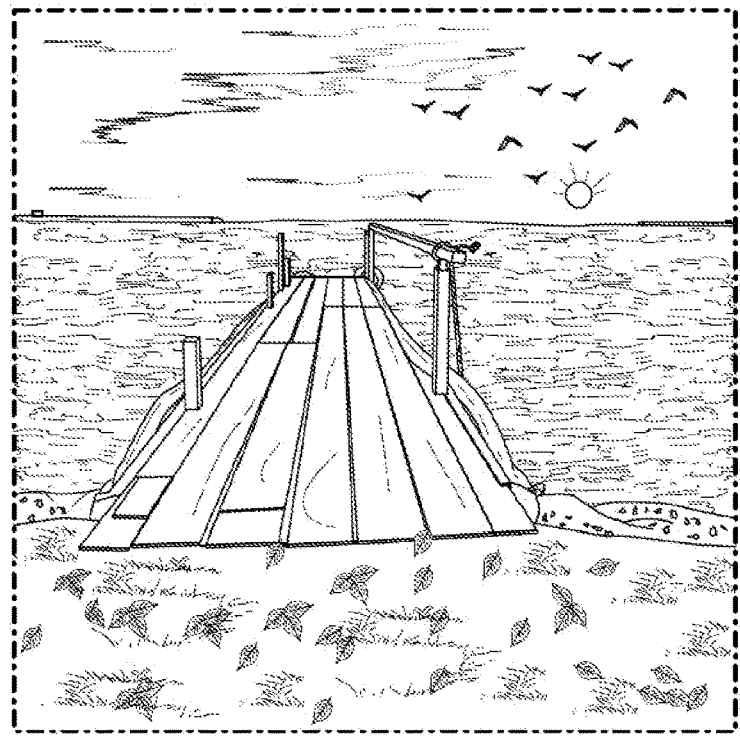
Figure 3M:
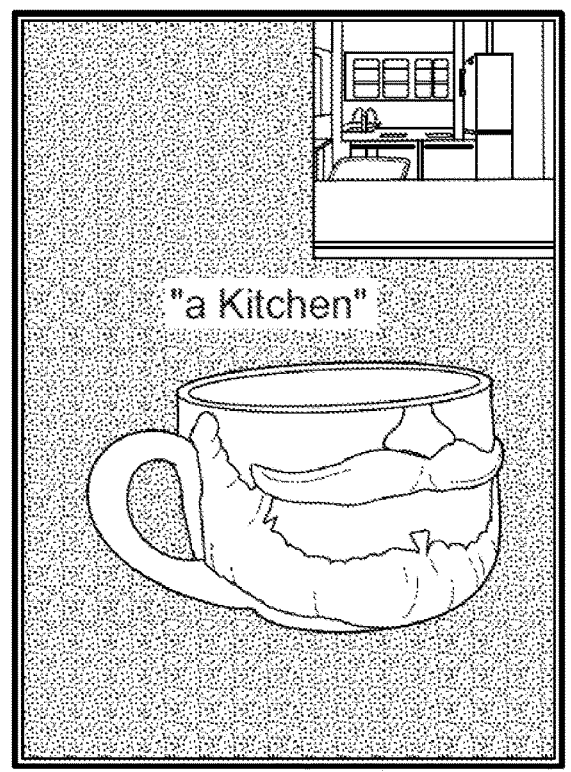
Figure 3M:
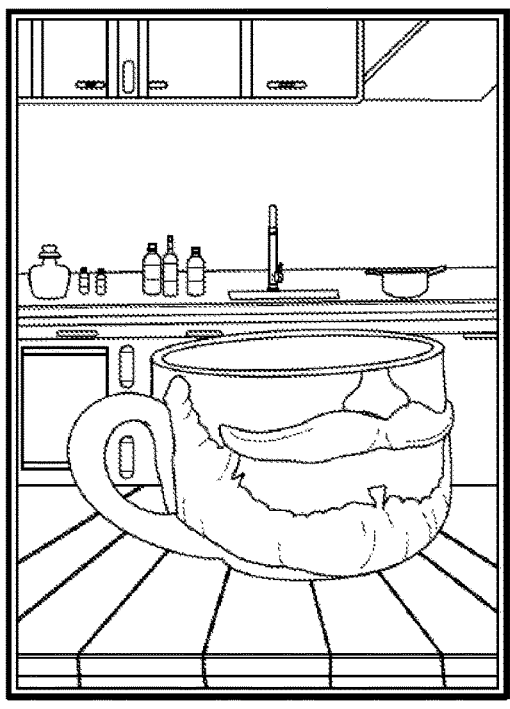
Figure 3M:
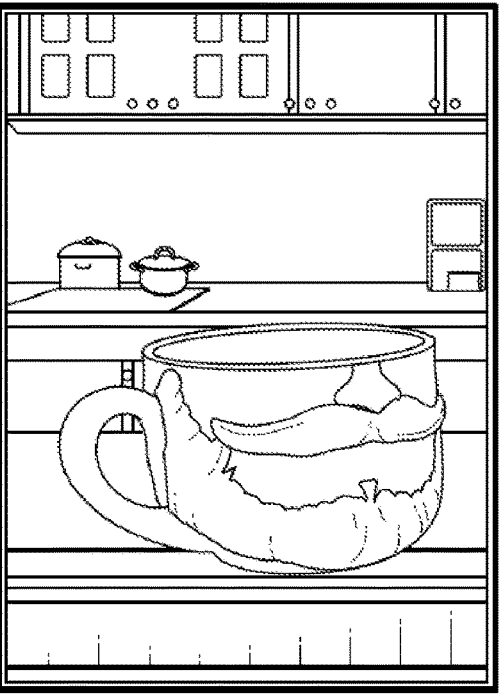
Figure 3N:
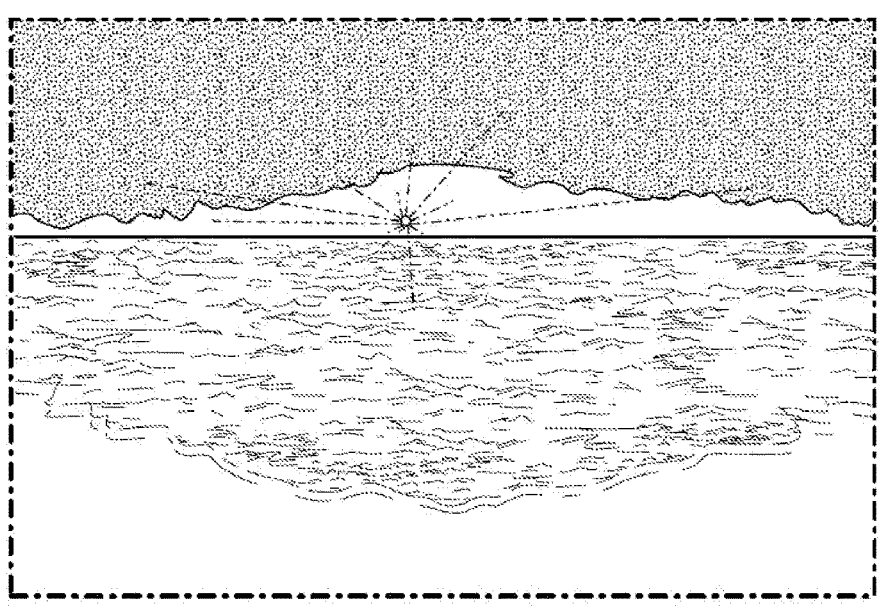
Figure 3N:
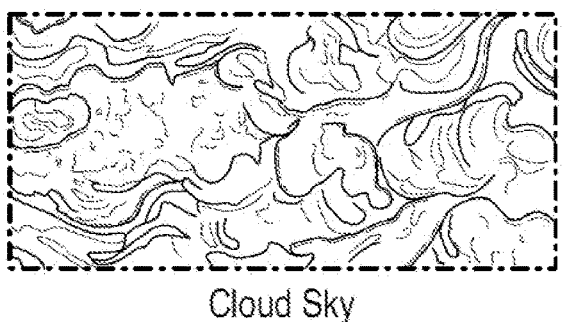
Figure 3N:
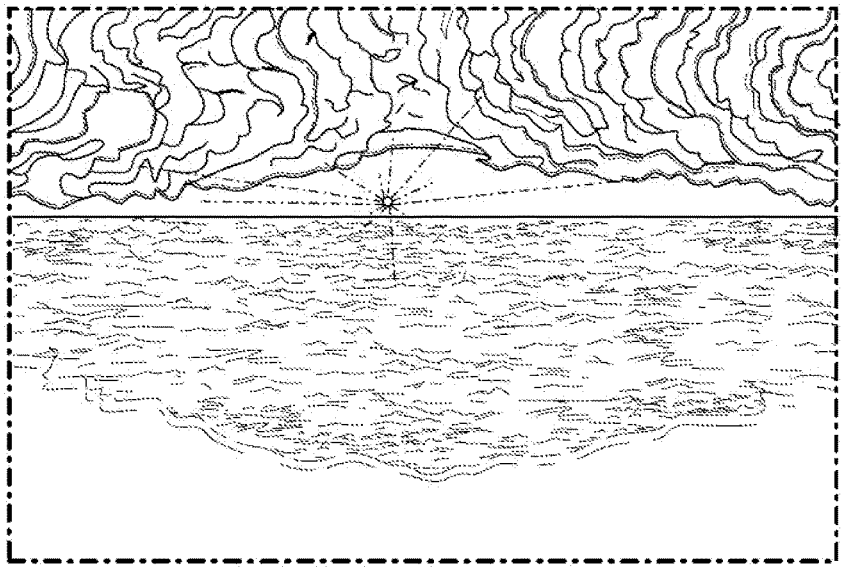

FIGS. 3A-3N show examples of generative image filling using a reference image according to aspects of the present disclosure. FIGS. 3A and 3B show examples of similar object insertion according to aspects of the present disclosure. Given an image of an object, an image editing apparatus may fill a hole in an input image with a similar object. In the example shown in FIG. 3A, an image generation model inpaints a hat onto an image of a man based on a reference image of a hat and a text prompt "Hat". In this example, an image generation model infers how the hat would look if placed on the man's head (i.e., a different view of the hat from the reference image).

FIG. 3C shows an example of generating object variations according to aspects of the present disclosure. A reference image may be a same cropped image within a hole of an input image, and an image editing apparatus may generate more variations of the content within the hole. In this example, a user identifies the lighthouse and the building atop the turtle's back by drawing a mask. According to some aspects, the system presents the variations to the user for editing or approval.

FIG. 3D shows an example of object insertion with enhanced harmonization with a background according to aspects of the present disclosure. A reference image may be any local crop within an input image, and an image editing apparatus may generate objects better harmonized with an image background style. The reference image may be used for global context and harmonization enhancement. Harmonization, in this context, refers to the inpainted content's plausibility with its background, which can be influenced by, e.g., lighting detail, color detail, and semantic features.

FIGS. 3E-3I show examples of object replacement with a similar object texture or style according to aspects of the present disclosure. Given another image with a specific style or texture, an image editing apparatus may generate objects with a similar style or texture. FIG. 3E shows an example of object replacement using an object image as a reference image. FIGS. 3F-3I show examples of object replacement using a texture image as the reference image.

FIGS. 3J-3L show examples of scene completion or outpainting with similar contents from another image according to aspects of the present disclosure. A large portion of missing regions in an image may be masked, and, given a reference image, an image editing apparatus may generate scenes including similar contents to the reference image (e.g., to fill the missing regions). FIG. 3J shows an example of scene completion using a scene image as a reference image. FIGS. 3K and 3L shows examples of outpainting with a reference image.

FIG. 3M shows an example of background replacement with similar contents from another image according to aspects of the present disclosure. Given a reference background image, an image editing apparatus may generate a background following the elements or styles of the reference background image.

FIG. 3N shows an example of stylized scene completion with similar styles from another image according to aspects of the present disclosure. Given a stylized image, an image editing apparatus may generate a scene following the specific styles of the stylized image and composite the styles of the stylized image and an input image.

Figure 4:
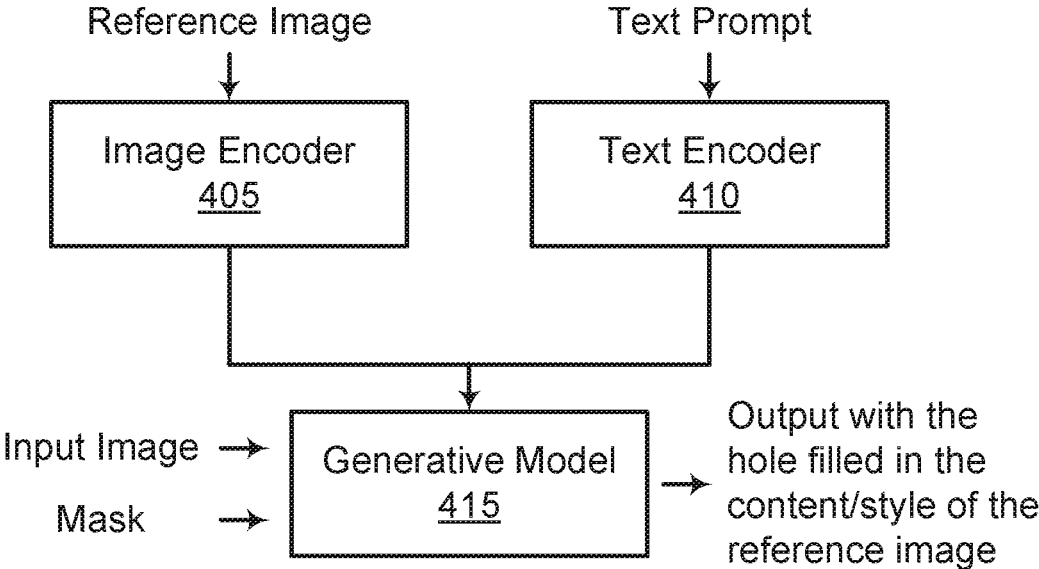
FIG. 4 shows an example of an architecture for generative image filling using a reference image according to aspects of the present disclosure.

FIG. 4 shows an example of an architecture 400 for generative image filling using a reference image according to aspects of the present disclosure. The architecture 400 includes an image encoder 405, a text encoder 410, and a generative model 415. The image encoder 405, text encoder 410, and the generative model 415 are examples of, or includes aspects of, the corresponding elements described with reference to FIG. 2. The image encoder 405 may generate an image embedding based on a reference image, and the text encoder 410 may generate a text embedding based on a text prompt. The generative model 415 may generate a composite image based on an input image and a mask using the image embedding from the image encoder 405 and the text embedding from the text encoder 410.

The generative model 415 may modify a region of the input image corresponding to the mask using the reference image (e.g., based on the image embedding) and using the text prompt (e.g., based on the text embedding). Thus, the output of the generative model 415 may be the input image with the hole filled with the content or style of the reference image. During training of an image editing apparatus including the image encoder 405, the text encoder 410, and the generative model 415, the reference image may be the same as an unmasked input image. In some examples, for classifier-free guidance in inference, a large portion (e.g., 90%) of the reference images may be randomly dropped during training. During testing, an image editing apparatus may be randomly fed with any reference image to run an inpainting algorithm.

An image editing apparatus implementing the architecture 400 (e.g., a model pipeline) may support image filling using a reference image. The image editing apparatus may use a reference image embedding together with generative image inpainting to achieve reference-guided image filling and support a wide range of applications (e.g., guided inpainting, image inpainting, object insertion). For instance, the image editing apparatus may use another image as a reference for filling a hole in an input image. In some cases, an image generation model may use a reference image for text-to-image generation or use the reference image to guide generation styles. An image editing apparatus may support using a reference image as guidance for filling the hole in an input image, support flexible reference from styles to contents, support using a reference image together with a text prompt, and support multiple real use cases.

An image editing apparatus implementing the architecture 400 may also support inserting an object from a reference image into an input image while preserving the identity of the object. In some examples, it may be appropriate to insert an object into an input image by referring to a reference image. However, because the reference image may be encoded into a fixed-size embedding (e.g., 1024 dimension), it may be challenging to capture all the spatial details of the object. In particular, it may be challenging to maintain the distinctiveness and recognizability of an object that is being inserted into an input image. In other words, even after the object has been inserted and possibly modified to fit into a new context, the object may not be recognizable as the same object from a reference image.

In some examples, an image generation model may use an additional image encoder and an adaptor to utilize the cross-attention of an image generator for identical object insertion. However, it may be appropriate to perform additional training for the additional image encoder and the adaptor, and the identity preservation quality of such an image generation model may still not yet be good for large geometric changes. An image editing apparatus implementing the architecture 400 may apply self-attention to perform object insertion while preserving the identity of an object in a reference image. As such, additional training may be avoided for object insertion. The image editing apparatus may leverage the nature of images where repeating objects may be widely existing in natural images (e.g., a single training image).

During inference, suppose an image generation model (e.g., the generative model 415) has a self-attention component, then an object may be directly copied and pasted with a high level of identity preservation (e.g., if the reference image including the object is composited beside a hole or a mask corresponding to a mask). Because the image editing apparatus implementing the architecture 400 may use self-attention to perform object insertion, the image editing apparatus may avoid additional finetuning or training to encode the object prior to insertion. In some examples, adding copy-paste augmentation for training may improve the performance of the image editing apparatus. Further, because the architecture 400 may not include an additional encoder for encoding an object prior to insertion, the architecture 400 may save computation time. In addition, the architecture 400 may achieve reasonable identity preservation when using a reference image for an object insertion (e.g., composite) task.

Figure 5:
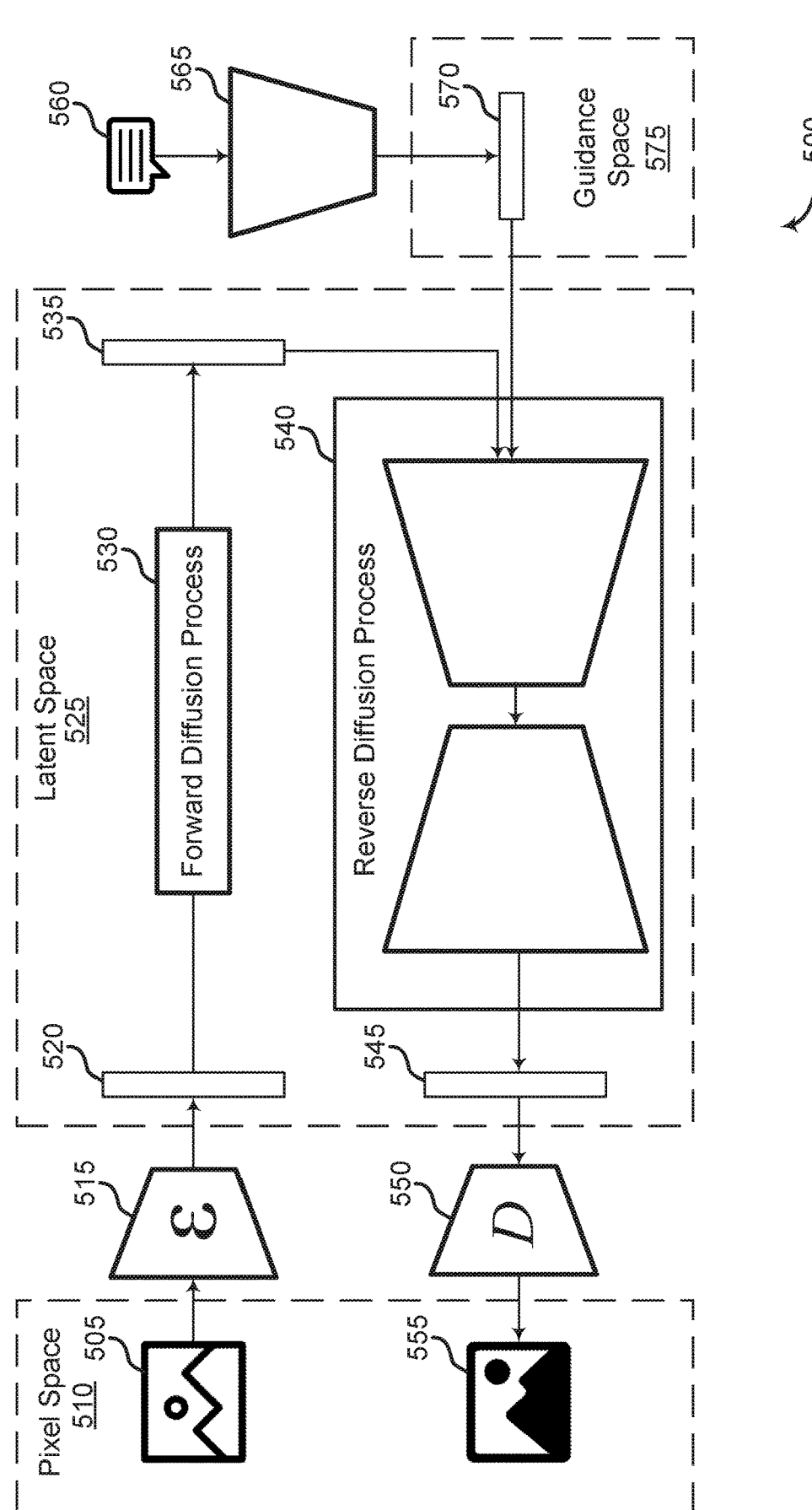
FIG. 5 shows an example of a guided latent diffusion model according to aspects of the present disclosure.

FIG. 5 shows an example of a guided latent diffusion model 500 according to aspects of the present disclosure. The guided latent diffusion model 500 depicted in FIG. 5 is an example of, or includes aspects of, the image generation model described with reference to FIG. 2.

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include DDPMs and DDIMs. In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 500 may take an original image 505 in a pixel space 510 as input and apply and image encoder 515 to convert original image 505 into original image features 520 in a latent space 525. Then, a forward diffusion process 530 gradually adds noise to the original image features 520 to obtain noisy features 535 (also in latent space 525) at various noise levels.

Next, a reverse diffusion process 540 (e.g., a U-Net ANN) gradually removes the noise from the noisy features 535 at the various noise levels to obtain denoised image features 545 in latent space 525. In some examples, the denoised image features 545 are compared to the original image features 520 at each of the various noise levels, and parameters of the reverse diffusion process 540 of the diffusion model are updated based on the comparison. Finally, an image decoder 550 decodes the denoised image features 545 to obtain an output image 555 in pixel space 510. In some cases, an output image 555 is created at each of the various noise levels. The output image 555 can be compared to the original image 505 to train the reverse diffusion process 540.

In some cases, image encoder 515 and image decoder 550 are pre-trained prior to training the reverse diffusion process 540. In some examples, they are trained jointly, or the image encoder 515 and image decoder 550 are fine-tuned jointly with the reverse diffusion process 540.

The reverse diffusion process 540 can also be guided based on a text prompt 560, or another guidance prompt, such as an image, a layout, a segmentation map, etc. The text prompt 560 can be encoded using a text encoder 565 (e.g., a multimodal encoder) to obtain guidance features 570 in guidance space 575. The guidance features 570 can be combined with the noisy features 535 at one or more layers of the reverse diffusion process 540 to ensure that the output image 555 includes content described by the text prompt 560. For example, guidance features 570 can be combined with the noisy features 535 using a cross-attention block within the reverse diffusion process 540.

Image Editing

Figure 6:
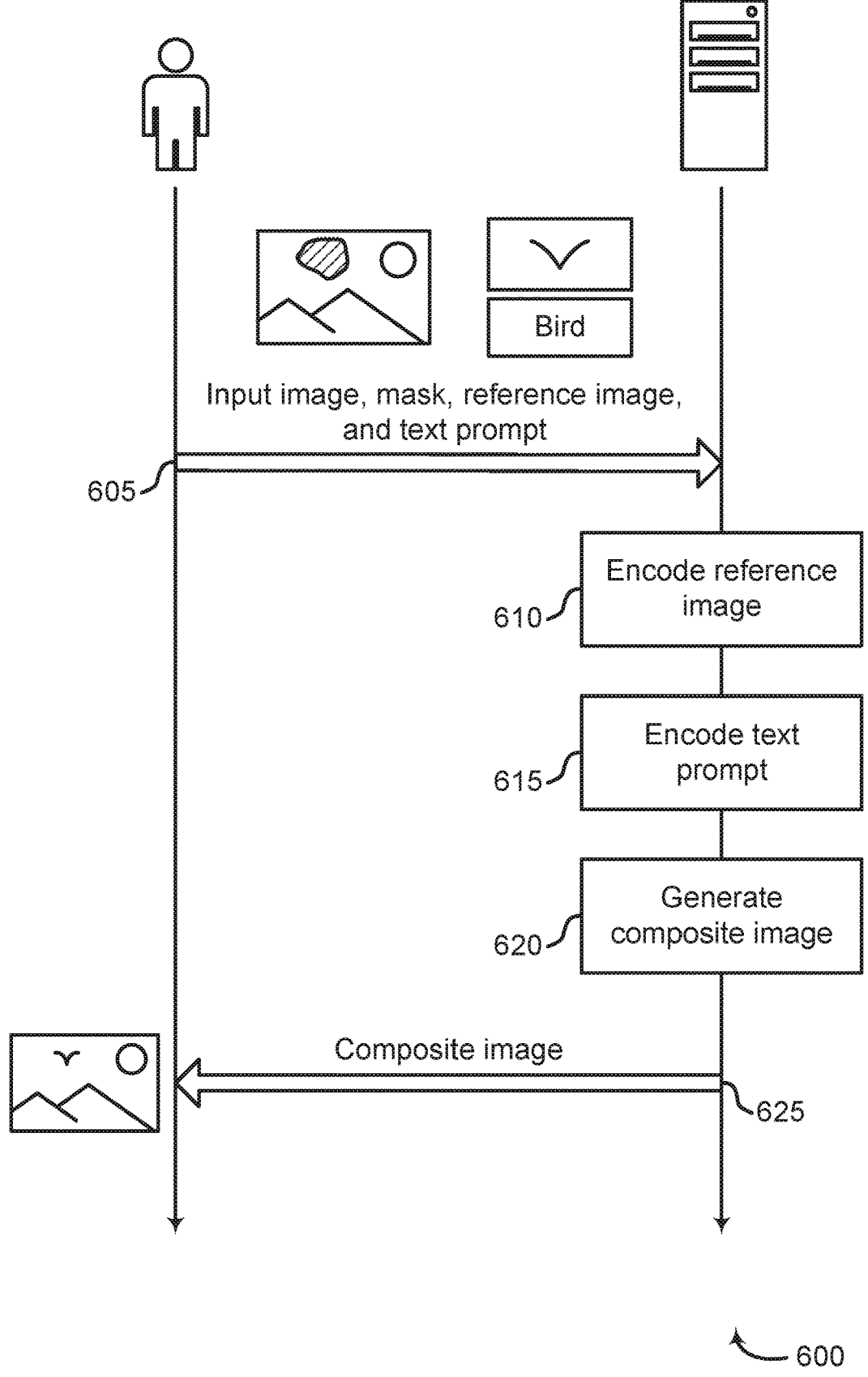
FIG. 6 shows an example of a method for generative image filling using a reference image according to aspects of the present disclosure.
Figure 7:
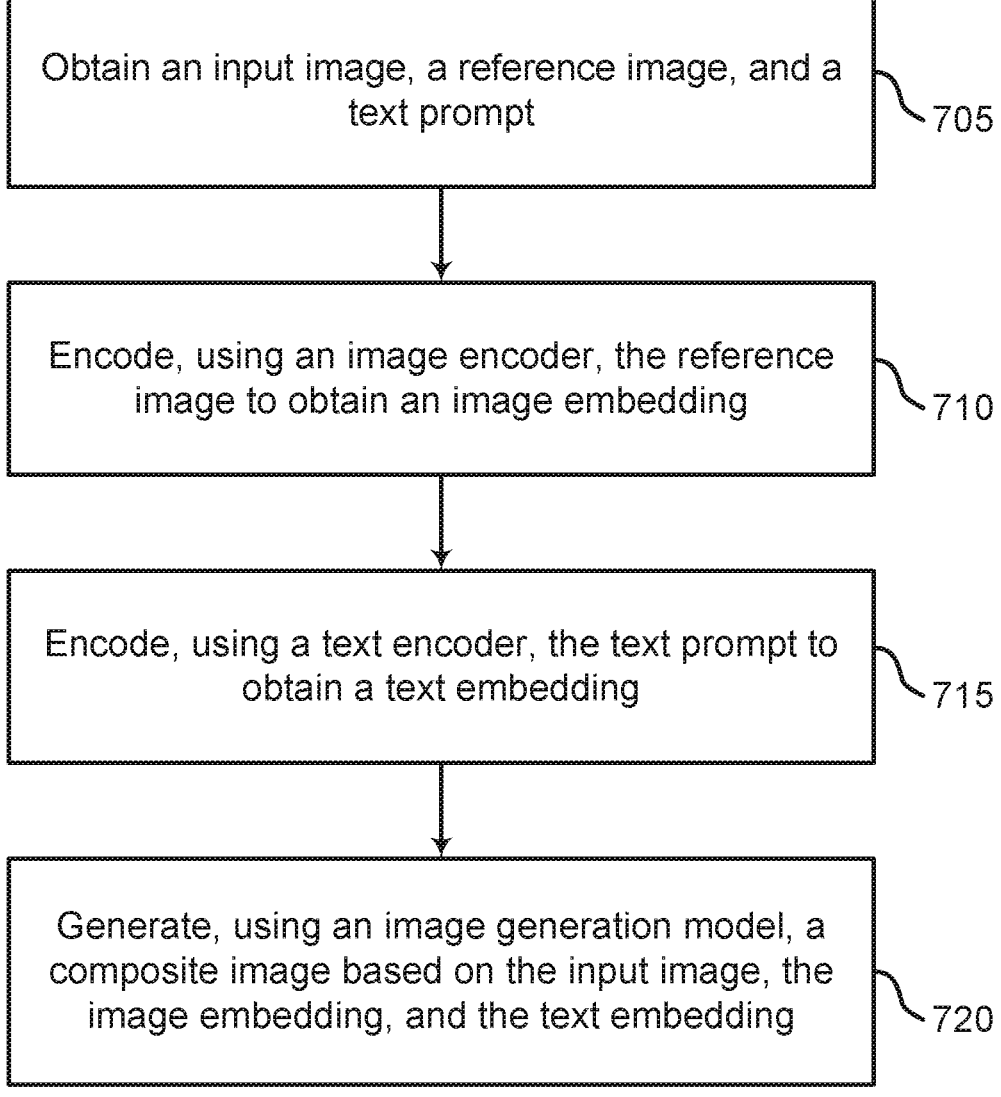
FIGS. 7 through 8 show examples of methods for generating a composite image according to aspects of the present disclosure.
Figure 8:
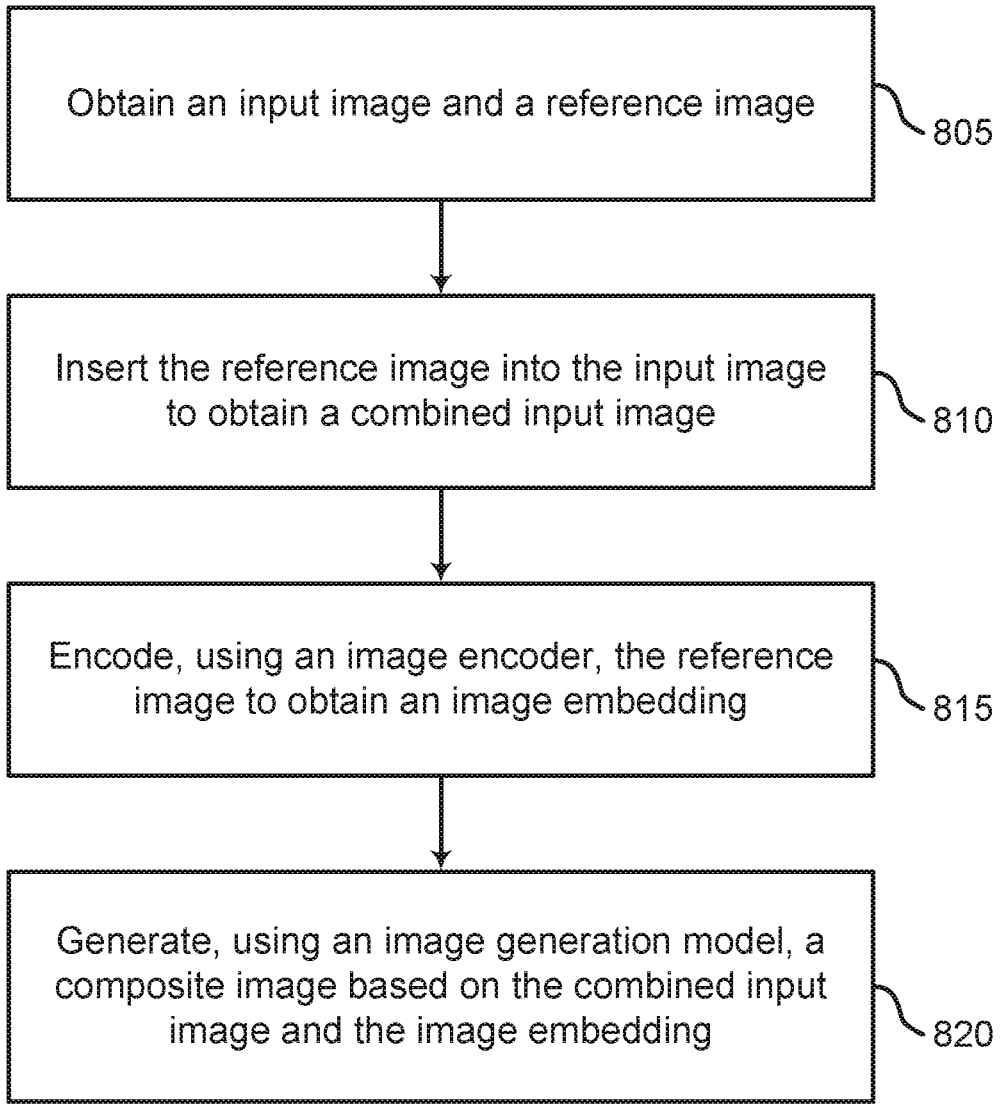

In FIGS. 6-8, a method, apparatus, non-transitory computer-readable medium, and system for machine learning for image editing is described. One or more aspects of the method include obtaining an input image, a mask, a reference image, and a text prompt; encoding, using an image encoder, the reference image to obtain an image embedding; encoding, using a text encoder, the text prompt to obtain a text embedding; and generating, using an image generation model, a composite image based on the input image, the mask, the image embedding, and the text embedding.

Some examples of the method, apparatus, non-transitory computer readable medium, and system further include providing the image embedding and the text embedding as guidance for the image generation model. In some aspects, the composite image includes content corresponding to the reference image in a region corresponding to the mask. In some aspects, the composite image includes content corresponding to the input image in a region outside of the mask.

In some aspects, the text prompt describes an object in the reference image. The reference image may be an independent image from the input image that doesn't include content from the input image, or may comprise a portion of the input image. In some aspects, the reference image comprises a style from the input image.

In some aspects, the composite image includes an object described by the text prompt with a style from the reference image. In some aspects, the mask indicates a background region generated by the image generation model based on the reference image.

Another method, apparatus, non-transitory computer-readable medium, and system for machine learning for image editing is described. One or more aspects of the method include obtaining an input image, a mask, and a reference image; inserting the reference image into the input image to obtain a combined input image; encoding, using an image encoder, the reference image to obtain an image embedding; and generating, using an image generation model, a composite image based on the combined input image, the mask, and the image embedding.

Some examples of the method, apparatus, non-transitory computer readable medium, and system further include performing, by the image generation model, a self-attention operation on the combined input image, wherein the composite image is generated based on the self-attention operation.

Some examples of the method, apparatus, non-transitory computer readable medium, and system further include obtaining a text prompt. Some examples further include encoding, using a text encoder, the text prompt to obtain a text embedding, wherein the composite image is generated based on the text embedding. In some aspects, the reference image is inserted into the input image in a region outside of the mask.

FIG. 6 shows an example of a method 600 for generative image filling using a reference image according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, a user may provide an input image, a mask, a reference image, or a text prompt to an image editing apparatus. The mask may be a masked region of the input image, and the reference image and the text prompt may be used as guidance to edit the masked region of the input image. In some cases, the operations of this step refer to, or may be performed by, a user via a user device as described with reference to FIG. 1.

At operation 610, the image editing apparatus may encode the reference image to obtain an image embedding. The image embedding may be an embedding in a latent space of an image generation model and may be provided as guidance for the image generation model to edit the input image. In some cases, the operations of this step refer to, or may be performed by, an image encoder as described with reference to FIG. 2.

At operation 615, the image editing apparatus may encode the text prompt to obtain a text embedding. The text embedding may be an embedding in a latent space of an image generation model and may be provided as guidance for the image generation model to edit the input image. In some examples, the text embedding may be an embedding in a same latent space as the image embedding. In some cases, the operations of this step refer to, or may be performed by, a text encoder as described with reference to FIG. 2.

At operation 620, the image editing apparatus may generate a composite image based on the input image, the mask, the reference image, and the text prompt. For example, the image editing apparatus may edit a region of the input image corresponding to the mask based on the reference image and the text prompt. In some cases, the operations of this step refer to, or may be performed by, an image generation model as described with reference to FIG. 2.

At operation 625, the image editing apparatus may provide the composite image to the user. The composite image may incorporate the reference image and the text prompt obtained at operation 605. For example, the composite image may include an object from the reference image or may be styled in a similar style to the reference image. In some cases, the operations of this step refer to, or may be performed by, an image editing apparatus as described with reference to FIGS. 1. and 2.

FIG. 7 shows an example of a method 700 for generating a composite image according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

In some examples, the method 700 may support reference-guided image generation for generative hole filling. In some examples, the method 700 may be implemented to adapt reference-guided image hole filling to many real user applications including object insertion and scene completion. In some examples, the method 700 may enable generating contents within an image hole by following the styles, textures, or contents of a reference image.

At operation 705, the system obtains an input image, a reference image, and a text prompt. The system may also receive a mask. The mask may be specified by a user, or may be determined based on the text prompt, the input image, or the reference image. The mask may be a masked region of the input image, and the reference image and the text prompt may be used as guidance to edit the masked region of the input image. In some cases, the operations of this step refer to, or may be performed by, an image editing apparatus as described with reference to FIGS. 1 and 2.

At operation 710, the system encodes, using an image encoder, the reference image to obtain an image embedding. The image embedding may be an embedding in a latent space of an image generation model and may be provided as guidance for the image generation model to edit the input image. In some cases, the operations of this step refer to, or may be performed by, an image encoder as described with reference to FIG. 2.

At operation 715, the system encodes, using a text encoder, the text prompt to obtain a text embedding. The text embedding may be an embedding in a latent space of an image generation model and may be provided as guidance for the image generation model to edit the input image. In some examples, the text embedding may be an embedding in a same latent space as the image embedding. In some cases, the operations of this step refer to, or may be performed by, a text encoder as described with reference to FIG. 2.

At operation 720, the system generates, using an image generation model, a composite image based on the input image, the mask, the image embedding, and the text embedding. In some examples, the composite image may include an object from the reference image or may be styled in a similar style to the reference image. In some cases, the operations of this step refer to, or may be performed by, an image generation model as described with reference to FIG. 2.

FIG. 8 shows an example of another method 800 for generating a composite image according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system obtains an input image and a reference image. The system may also receive a mask. The mask may be specified by a user, or may be determined based on the input image or the reference image. The mask may be a masked region of the input image, and the reference image may be used as guidance to edit the masked region of the input image. In some cases, the operations of this step refer to, or may be performed by, an image editing apparatus as described with reference to FIGS. 1 and 2.

At operation 810, the system inserts the reference image into the input image to obtain a combined input image. Because the reference image may be inserted into the input image, an image generation model may be able to use a self-attention operation to fill a masked portion of the input image using the reference image (e.g., by relating the masked portion of the input image to the portion of the combined input image including the inserted reference image). In some cases, the operations of this step refer to, or may be performed by, an image editing apparatus as described with reference to FIGS. 1 and 2.

At operation 815, the system encodes, using an image encoder, the combined image to obtain an image embedding. The image embedding may be an embedding in a latent space of an image generation model and may be provided as guidance for the image generation model to edit the input image. In some cases, the operations of this step refer to, or may be performed by, an image encoder as described with reference to FIG. 2.

At operation 820, the system generates, using an image generation model, a composite image based on the combined input image, the mask, and the image embedding. The composite image may include an object from the reference image that is blended with the features of the composite image while preserving the identity of the object. In some cases, the operations of this step refer to, or may be performed by, an image generation model as described with reference to FIG. 2.

Image Editing

Figure 9:
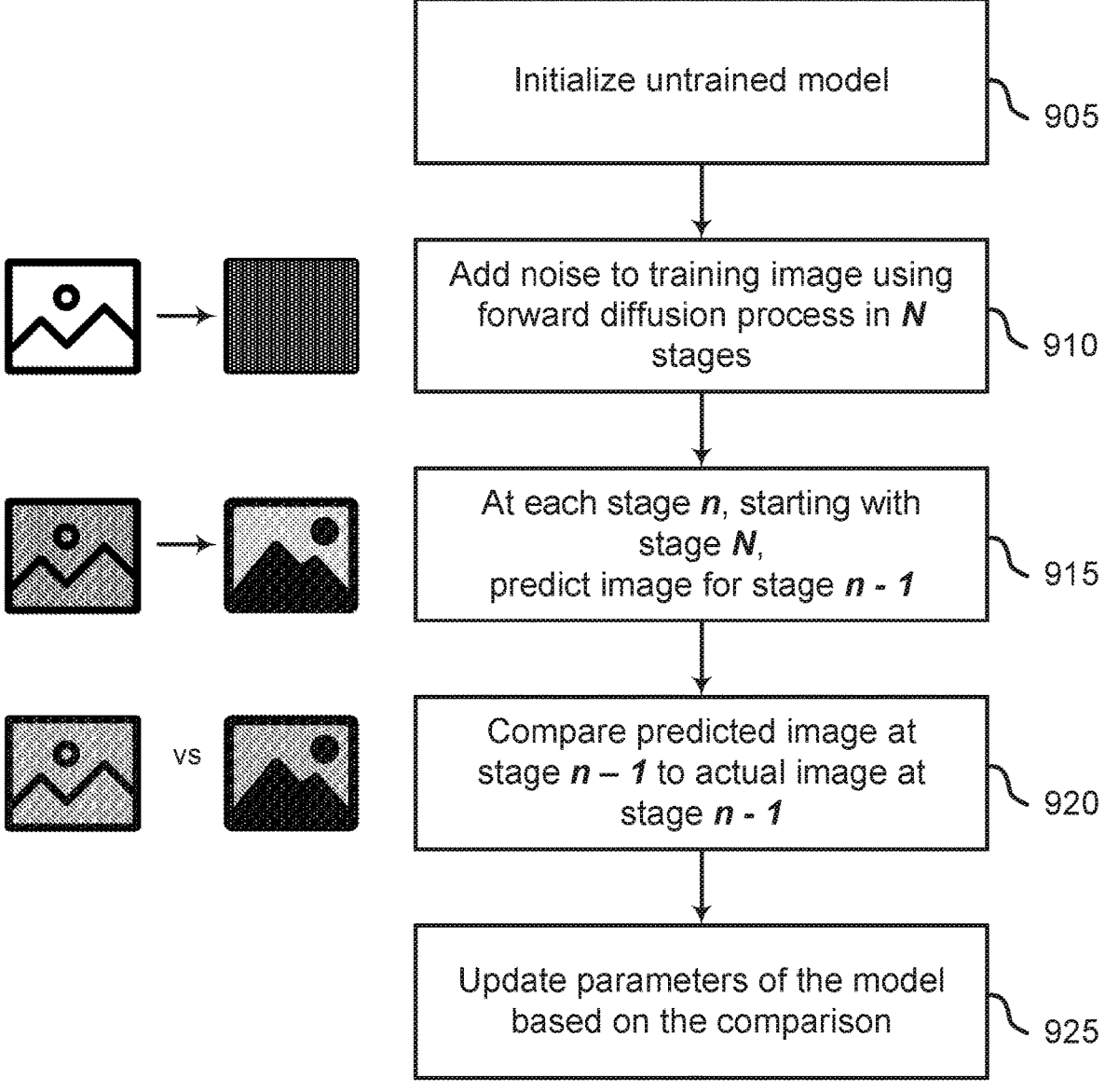
FIG. 9 shows an example of a method for training a diffusion model according to aspects of the present disclosure.

FIG. 9 shows an example of a method 900 for training a diffusion model according to aspects of the present disclosure. The method 900 represents an example for training a reverse diffusion process. In some examples, these operations are performed by a system including a processor executing a set of codes to control functional elements of an apparatus, such as the apparatus described in FIG. 2.

Additionally, or alternatively, certain processes of method 900 may be performed using special-purpose hardware. Generally, these operations are performed according to the methods and processes described in accordance with aspects of the present disclosure. In some cases, the operations described herein are composed of various substeps, or are performed in conjunction with other operations.

At operation 905, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 910, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 915, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 920, the system compares the predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data.

At operation 925, the system updates parameters of the model based on the comparison. For example, parameters of a U-Net may be updated using gradient descent. Time-dependent parameters of the Gaussian transitions can also be learned.

Figure 10:
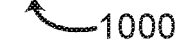
FIG. 10 shows an example of a computing device for image editing according to aspects of the present disclosure.

FIG. 10 shows an example of a computing device 1000 for image editing according to aspects of the present disclosure. In one aspect, computing device 1000 includes processor(s) 1005, memory subsystem 1010, communication interface 1015, I/O interface 1020, user interface component(s) 1025, and channel 1030.

In some embodiments, computing device 1000 is an example of, or includes aspects of, image processing apparatus 200 of FIG. 2. In some embodiments, computing device 1000 includes one or more processors 1005 that can execute instructions stored in memory subsystem 1010 for obtaining an input image, a mask, a reference image, and a text prompt; encoding, using an image encoder, the reference image to obtain an image embedding; encoding, using a text encoder, the text prompt to obtain a text embedding; and generating, using an image generation model, a composite image based on the input image, the mask, the image embedding, and the text embedding.

According to some aspects, computing device 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1010 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1015 operates at a boundary between communicating entities (such as computing device 1000, one or more user devices, a cloud, and one or more databases) and channel 1030 and can record and process communications. In some cases, communication interface 1015 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1020 is controlled by an I/O controller to manage input and output signals for computing device 1000. In some cases, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some aspects, user interface component(s) 1025 enable a user to interact with computing device 1000. In some cases, user interface component(s) 1025 include an audio device, such as an external speaker system, an external display device such as a display screen, an input device (e.g., a remote-control device interfaced with a user interface directly or through the I/O controller), or a combination thereof. In some cases, user interface component(s) 1025 include a GUI.

The description and drawings described herein represent example configurations and do not represent all the implementations within the scope of the aspects. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following aspects, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining an input image, a mask, a reference image, and a text prompt, wherein the mask indicates a region of the input image, and the text comprises guidance for editing the region of the input image based on the reference image;
encoding, using an image encoder, the reference image to obtain an image embedding;
encoding, using a text encoder, the text prompt to obtain a text embedding; and
generating, using an image generation model, a composite image based on the input image, the image embedding, and the text embedding, wherein the composite image includes content from the input image outside the region indicated by the mask and content from the reference image within the region indicated by the mask.

2. The method of claim 1, wherein generating the composite image comprises:
providing the image embedding and the text embedding as guidance for the image generation model.

3. The method of claim 1, wherein:
the composite image includes content corresponding to the reference image in a region corresponding to a mask.

4. The method of claim 1, wherein:
the composite image includes content corresponding to the input image in a region outside of a mask.

5. The method of claim 1, wherein:
the text prompt describes an object in the reference image.

6. The method of claim 1, wherein:
the reference image comprises a portion of the input image.

7. The method of claim 1, wherein:
the reference image comprises a style from the input image.

8. The method of claim 1, wherein:
the composite image includes an object described by the text prompt with a style from the reference image.

9. The method of claim 1, further comprising:

receiving a mask from a user, wherein the mask indicates a region generated by the image generation model based on the reference image.

10. The method of claim 1, further comprising:

generating a mask based on the input image, the reference image, or the text prompt, wherein the mask indicates a region generated by the image generation model.

11. A method comprising:

obtaining an input image, a mask, and a reference image, wherein the mask indicates a region of the input image;

inserting the reference image into the input image based on the mask to obtain a combined input image;

encoding, using an image encoder, the reference image to obtain an image embedding; and generating, using an image generation model, a composite image based on the combined input image and the image embedding, wherein the composite image includes content from the input image outside the region indicated by the mask and content from the reference image within the region indicated by the mask.

12. The method of claim 11, further comprising:

performing, by the image generation model, a self-attention operation on the combined input image, wherein the composite image is generated based on the self-attention operation.

13. The method of claim 11, further comprising:

obtaining a text prompt; and encoding, using a text encoder, the text prompt to obtain a text embedding, wherein the composite image is generated based on the text embedding.

14. The method of claim 11, wherein:

the reference image is inserted into the input image in a region outside of a mask.

15. An apparatus comprising:

at least one memory;

at least one processor coupled to the at least one memory, wherein the processor is configured to execute instructions stored in the at least one memory;

an image encoder configured to encode a reference image to obtain an image embedding;

a text encoder configured to encode a text prompt to obtain a text embedding; and an image generation model configured to generate a composite image based on an input image, the image embedding, and the text embedding.

16. The apparatus of claim 15, wherein:

the image generation model comprises a diffusion model.

17. The apparatus of claim 15, wherein:

the image generation model comprises a self-attention layer configured to operate on a combination of the input image and the reference image.

18. The apparatus of claim 15, wherein:

the image encoder and the text encoder are components of a multimodal encoder.

19. The apparatus of claim 15, wherein:

the image generation model uses the image embedding and the text embedding for classifier-free guidance.

20. The apparatus of claim 15, further comprising:

a user interface configured to obtain a selection input from a user, wherein a mask is created based on the selection input.

* * * * *